United States Patent [19]
Keith

[11] Patent Number: 5,452,101
[45] Date of Patent: Sep. 19, 1995

[54] APPARATUS AND METHOD FOR DECODING FIXED AND VARIABLE LENGTH ENCODED DATA

[75] Inventor: Michael Keith, Holland, Pa.

[73] Assignee: Intel Corporation, Santa Clara, Calif.

[21] Appl. No.: 989,602

[22] Filed: Dec. 11, 1992

Related U.S. Application Data

[63] Continuation-in-part of Ser. No. 782,332, Oct. 24, 1991, Pat. No. 5,361,370.

[51] Int. Cl.[6] .............................................. H04N 1/41
[52] U.S. Cl. ................................................. 358/426
[58] Field of Search .................. 358/426, 261.1–261.2; 382/56; 341/67, 106–107, 59, 88

[56] References Cited

U.S. PATENT DOCUMENTS

| | | | |
|---|---|---|---|
| 4,800,441 | 1/1989 | Sato | 358/426 |
| 4,937,681 | 6/1990 | Fujinawa et al. | 358/426 |
| 5,216,518 | 6/1993 | Yamagami | 358/426 |

*Primary Examiner*—Stephen Brinich
*Attorney, Agent, or Firm*—N. Stephan Kinsella; Steve Mendelsohn; William H. Murray

[57] ABSTRACT

Single-instruction multiple-data is a new class of integrated video signal processors especially suited for real-time processing of two-dimensional images. The single-instruction, multiple-data architecture is adopted to exploit the high degree of parallelism inherent in many video signal processing algorithms. Features have been added to the architecture which support conditional execution and sequencing—an inherent limitation of traditional single-instruction multiple-data machines. A separate transfer engine offloads transaction processing from the execution core, allowing balancing of input-/output and compute resources—a critical factor in optimizing performance for video processing. These features, coupled with a scalable architecture allow a united programming model and application driven performance.

81 Claims, 11 Drawing Sheets

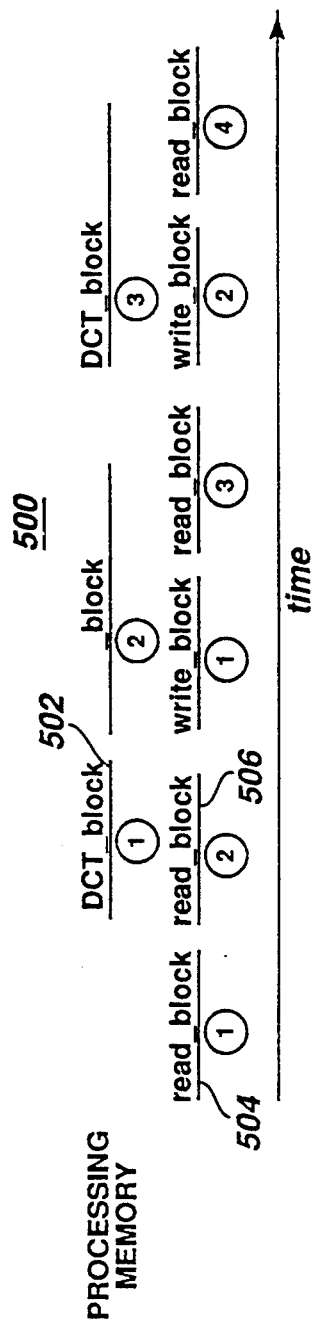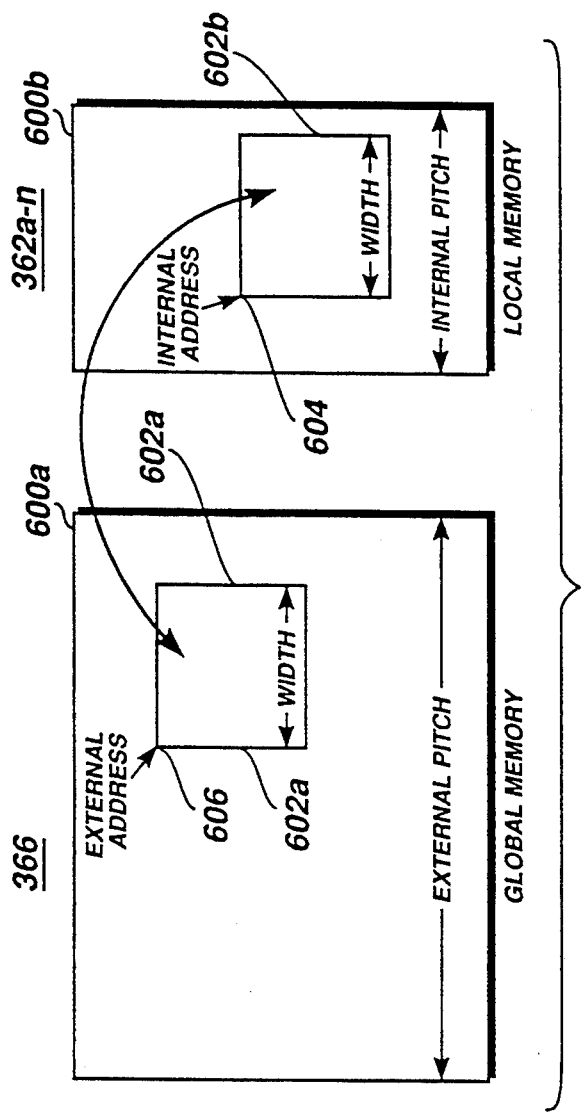

APPARATUS AND METHOD FOR DECODING FIXED AND VARIABLE LENGTH ENCODED DATA

This application is a continuation-in-part of U.S. application Ser. No. 07/782,332, filed Oct. 24, 1991, now U.S. Pat. No. 5,361,370, issued Nov. 1, 1994.

BACKGROUND OF THE INVENTION

1. Field of the Invention

This invention relates to the field of video signal processing, and, in particular, to video signal processing using an architecture having a plurality of parallel execution units.

2. Background Art

It is well known in the prior art to use multiple-instruction multiple-data systems for video signal processing. In a multiple-instruction multiple-data execution of an algorithm each processor of the video signal processor may be assigned a different block of image data to transform. Because each processor of a multiple-instruction multiple-data system executes its own instruction stream, it is often difficult to determine when individual processors have completed their assigned tasks. Therefore, a software synchronization barrier may be used to prevent any processors from proceeding until all processors in the system reach the same point. However it is sometimes difficult to determine where synchronization barriers are required. If a necessary barrier is omitted by a user then the resulting code may be nondeterministic and re-execution of the code on the same data may yield different results.

An alternate architecture known in the prior art is single-instruction multiple-data architecture. Single-instruction, multiple-data is a restricted style of parallel processing lying somewhere between traditional sequential execution and multiple-instruction multiple-data architecture having interconnected collections of independent processors. In the single-instruction, multiple-data model each of the processing elements, or datapaths, of an array of processing elements or datapaths executes the same instruction in lock-step synchronism. Parallelism is obtained by having each datapath perform the same operation on a different set of data. In contrast to the multiple-instruction, multiple-data architecture, only one program must be developed and executed.

Referring now to FIG. 1, there is shown prior art single-instruction multiple-data architecture 100. A conventional single-instruction multiple-data system, such as architecture 100, comprises a controller 112, a global memory 126 and execution datapaths 118a–n. A respective local memory 120a–n may be provided within each execution datapath 118a–n. Single-instruction multiple-data architecture 100 performs as a family of video signal processors 118a–n united by a single programming model.

Single-instruction multiple-data architecture 100 may be scaled to an arbitrary number n of execution datapaths 118a–n provided that all execution datapaths 118a–n synchronously execute the same instructions in parallel. In the optimum case, the throughput of single-instruction multiple-data architecture 100 may theoretically be n times the throughput of a uniprocessor when the n execution datapaths 118a–n operate synchronously with each other. Thus, in the optimum case, the execution time of an application may be reduced in direct proportion to the number n of execution datapaths 118a–n provided within single-instruction multiple-data architecture 100. However, because of overhead in the use of execution datapaths 118a–n, this optimum is never reached.

Architecture such as single-instruction multiple-data architecture 100 works best when executing an algorithm which repeats the same sequence of operations on several independent sets of highly parallel data. For example, for a typical image transform in the field of video image processing, there are no data dependencies among the various block transforms. Each block transform may be computed independently of the others.

Thus the same Sequence of instructions from instruction memory 124 may be executed in each execution datapath 118a–n. These same instructions are applied to all execution datapaths 118a–n by way of instruction broadcast line 116 and execution may be independent of the data processed in each execution datapath 118a–n. However, this is true only when there are no data-dependent branches in the sequence of instructions. When data-dependent branches occur, the data tested by the branch will, in general, have different values in each datapath. It will therefore be necessary for some datapaths 118a–n to execute the subsequent instruction and other datapaths 118a–n to not execute the subsequent instruction. For example, the program fragment of Table I clips a value v between a lower limit and an upper limit:

TABLE I

```
local v;
...
v = expression
if (v > UPPER_LIMIT)
    v = UPPER LIMIT;
if (v < LOWER_LIMIT)
    v = LOWER_LIMIT;
```

The value being clipped, v, is local to each execution datapath 118a–n. Thus, in general, each execution datapath 118a–n of single-instruction multiple-data architecture 100 executing the program fragment of Table I may have a different value for v. In some execution datapaths 118a–n the value of v may exceed the upper limit, and in others v may be below the lower limit. Other execution datapaths 118a–n may have values that are within range. However the execution model of single-instruction multiple-data architecture 100 requires that a single identical instruction sequence be executed in all execution datapaths 118a–n.

Thus some execution datapaths 118a–n may be required to idle while other execution datapaths 118a–n perform the conditional sequence of Table I. Furthermore, even if no execution datapaths 118a–n of single-instruction multiple-data architecture 100 are required to execute the conditional sequence of the program fragment of Table I, all execution datapaths 118a–n would be required to idle during the time of the conditional sequence.

Another problem with systems such as prior art single-instruction multiple-data architecture 100 is in the area of input/output processing. This problem arises due to the very large bandwidth requirements associated with this type of architecture. Even in conventional uniprocessor architecture a single block read instruction may take a long period of time to process because memory blocks may comprise a large amount of data in video image processing applications. However, this problem is compounded when there is a block transfer for each enabled execution datapath 118a–n of architecture 100 and datapaths 118a–n must compete for access to global memory 126. For example, arbitration overhead may be very time consuming. This is a problem particularly in video processing because of the large amount of data that must be processed in video applications.

The alternative of providing each execution datapath 118a–n with independent access to external memory 126 is impractical for semiconductor implementation. Furthermore, this alternative restricts the programming model so that data is not shared between datapaths 118a–n. Thus further inefficiency results due to the suspension of processing of instructions until all the block reads are completed. This may be seen in the discrete cosine transform image kernel of Table II:

TABLE II

```
for   (i = 0; i < NUMBEROFBLOCKS; i = i + 4) {
      k = i + THIS_DP_NUMBER;
      read_block(original_image[k],temp_block);
      DCT_block(temp_block);
      write_block(xform_image[k], temp_block);
      };
```

The read_block and write_block routines of the instruction sequence of Table II must be suspensive. Each must be completed before the next operation in the kernel is performed. For example, read_block fills temp_block in local memory 120a–n with all of its local values. These local values are then used by DCT_block to perform a discrete cosine transform upon the data in temp_block. Execution of the discrete cosine transform must wait for all of the reads of the read_block command of all execution datapaths 118a–n to be completed. Only then can the DCT_block and write_block occur. Thus, by the ordering rules above, read_block must be completed before the write_block is processed, or the DCT_block is executed.

Referring now to FIG. 2, there is shown processing-/memory time line 200. The requirements imposed by the ordering rules within single-instruction multiple data architecture 100 result in the sequentialization of memory transactions and processing as schematically illustrated by processing/memory time line 200. In time line 200, memory read_block time segment 202 of execution datapath 118a–n must be completed before processing of DCT_block time segment 204 may begin. Processing DCT_block time segment 204 must be completed before memory write_block time segment 206 may begin. Only when memory write_block time segment 206 of a execution datapath 118a–n is complete, can memory read_block time segment 208 of a execution datapath 118a–n begin. Execution and access by second execution datapath 118a–n is sequentialized as described for the first.

This problem occurs in high performance disk input-/output as well. In a typical disk input/output operation an application may require a transfer from disk while continuing to process. When the data from disk are actually needed, the application may synchronize on the completion of the transfer. Often, such an application is designed to be a multibuffered program. In this type of multibuffered program, data from one buffer is processed while the other buffer is being filled or emptied by a concurrent disk transfer. In a well designed system the input/output time is completely hidden. If not, the execution core of single-instruction multiple-data architecture 100 is wait-stated until the data becomes available. This causes further degrading of the performance of the single-instruction multiple-data architecture 100.

SUMMARY OF THE INVENTION

A single-instruction, multiple-data image processing system is provided for more efficiently using parallel datapaths when executing an instruction sequence having conditionals. At least two conditionals are sequentially determined according to the instructions. A respective mask flag is set for each conditional, wherein the mask flag is effective to instruct the datapath whether to execute an instruction or to idle during a selected instruction cycle. The mask flags are sequentially stored and later retrieved in a predetermined order. The execution unit of the datapath determines whether to execute an instruction or idle during selected instruction cycles according to the mask flags which are sequentially retrieved. Each datapath of the image processing system has an execution unit and a local memory which may be accessed only by the execution unit in the same datapath as the local memory. Access between the execution unit and the local memory is by way of one port of a dual-ported memory.

Thus the system of the present invention solves several problems associated with the single-instruction, multiple data architecture. One problem solved by the architecture of the present invention is that of efficiently permitting some datapaths, but not others, to execute particular instructions which have been issued by a common instruction store. This problem arises as a result of data dependencies and is solved by conditional execution and execution masks. During conditional execution every instruction which has been issued is executed or not executed by a particular datapath depending on the state of a data dependent condition code as calculated by the particular datapath. Each datapath can also set or clear its own particular local execution mask depending on the state of the data dependent condition code as calculated by the particular datapath. If the execution mask for a particular data path is active, the datapath ignores any instruction which has been issued. A special instruction command is provided to reactivate idle datapaths.

The execution mask feature is more general than the conditional execution feature because it permits nesting. The execution masks are saved on a stack within the datapaths. If the active subset of datapaths encounter data dependencies, additional datapaths may be turned off. The earlier state of the processor is restored by popping the execution mask stack. The conditional execution feature complements the execution mask feature by permitting a very efficient treatment of simple cases in which only a few instructions are data dependent and no nesting is involved.

All transfer between the local memory and the global memory takes place using one dedicated port of the local memory. The transfers are scheduled and controlled by a common unit called the block transfer controller. The block transfer controller, along with the dedicated port of the dual ported local memory, permit each access to global memory by a datapath to be overlapped with its instruction processing. This usually avoids stalling the processor.

BRIEF DESCRIPTION OF THE DRAWINGS

FIG. 5 shows a processing/memory time line for the architecture of FIG. 3;

FIG. 6 shows a schematic representation of a memory-to-memory block transfer within the architecture of FIG. 3;

DETAILED DESCRIPTION OF THE INVENTION

Figure 1:
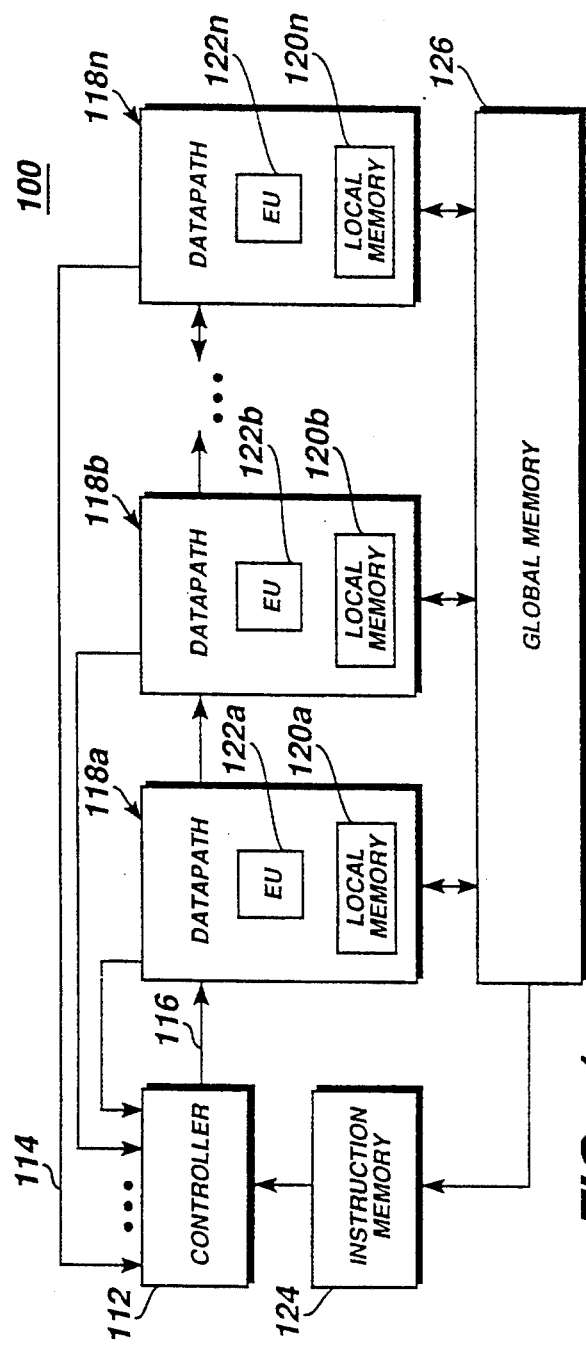
FIG. 1 shows a block diagram representation of a prior art single-instruction multiple-data architecture suitable for processing highly parallel data such as data representative of video images.
Figure 2:
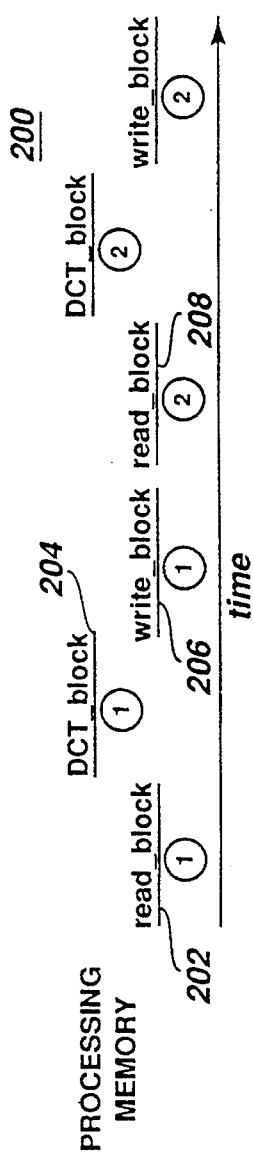
FIGS. 2 shows a processing/memory time line for the image processing architecture of FIG. 1.
Figure 3:
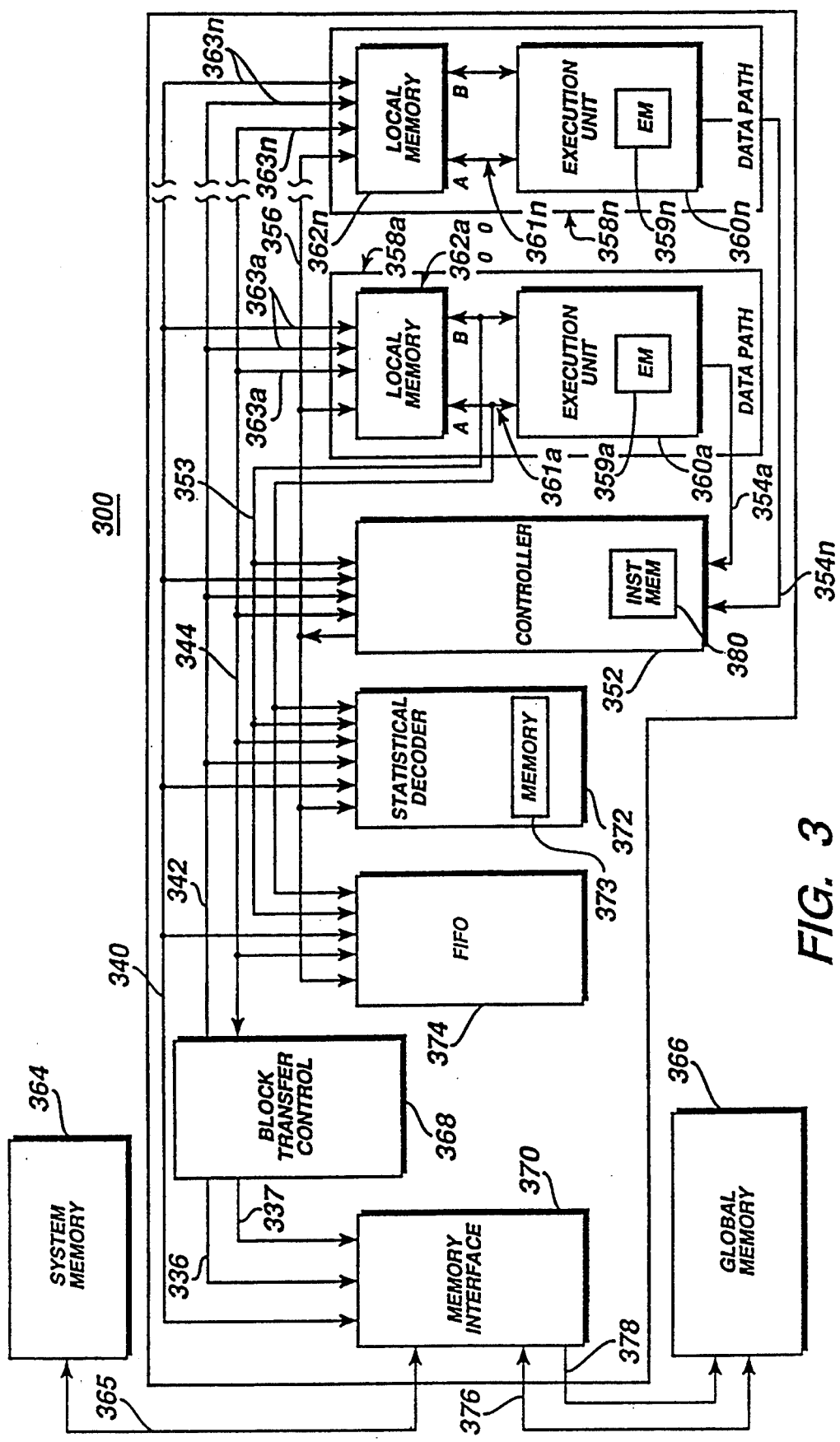
FIG. 3 shows the single-instruction multiple-data architecture image processor of the present invention.
Figure 4A:
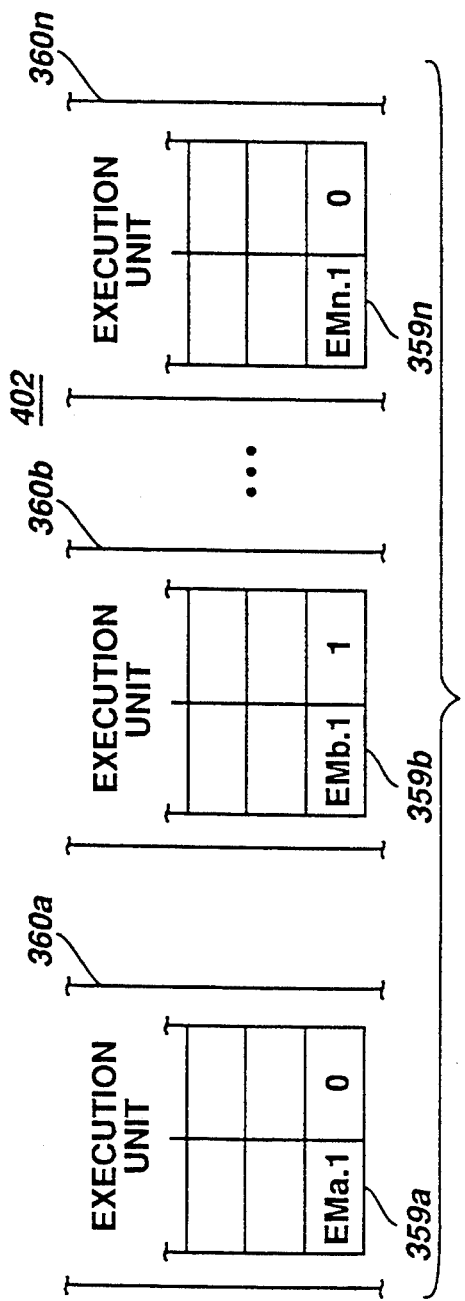
FIGS. 4A–D show execution mask stacks.
Figure 4B:
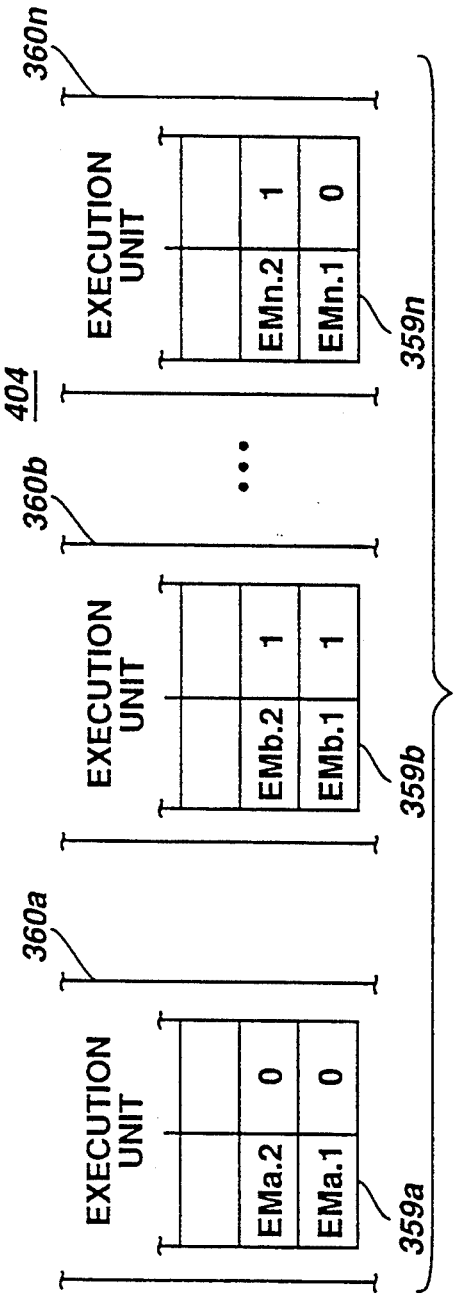
Figure 4C:
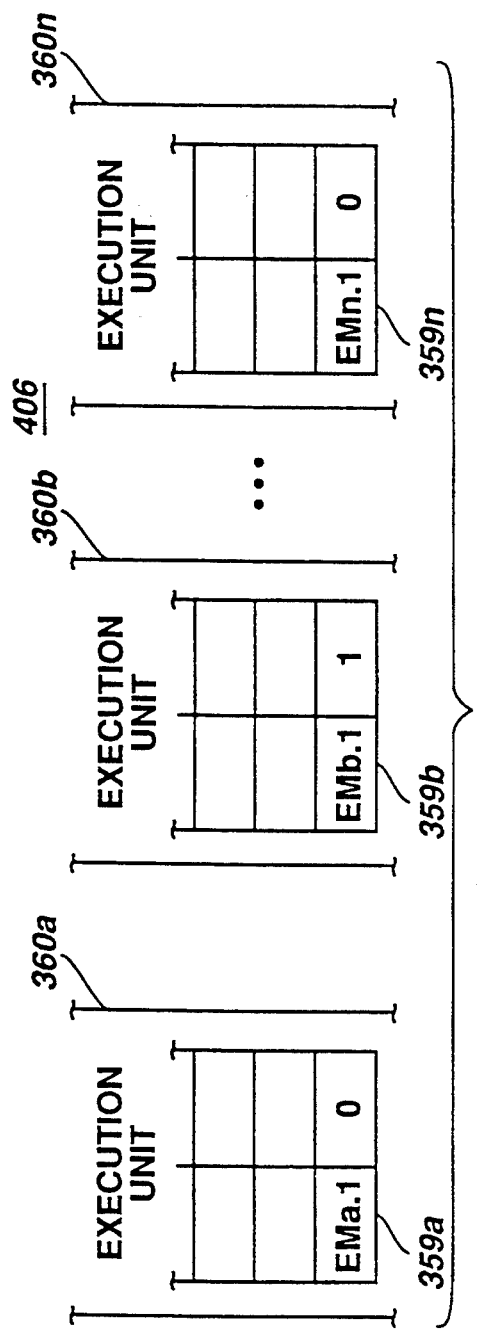
Figure 4D:
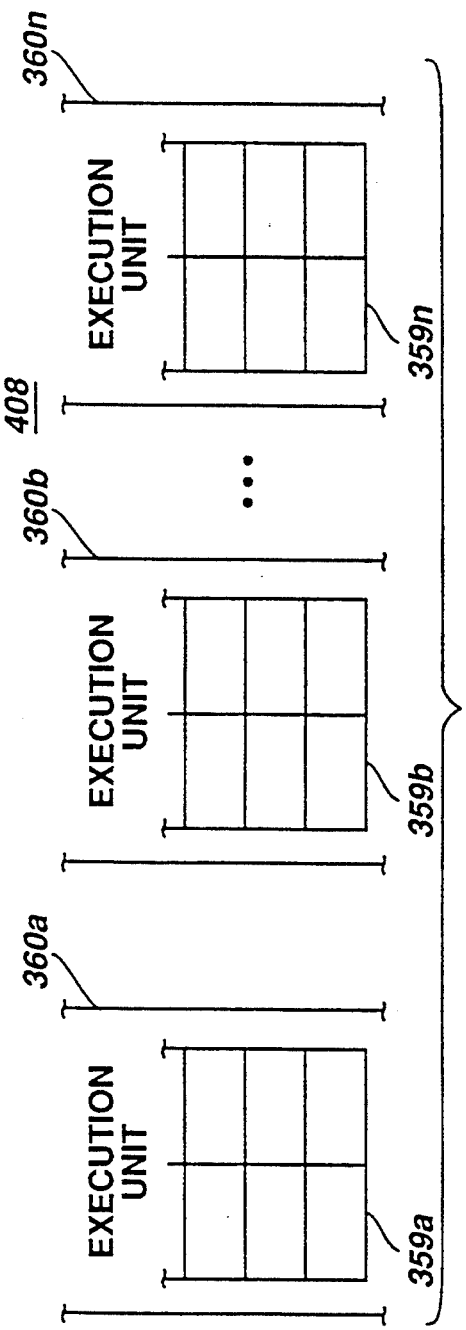

Referring now to FIG. 3, there is shown single-instruction multiple-data architecture image processor 300 of the present invention. Single-instruction multiple-data image processor 300 is provided with execution masks and conditional control flow during conditional branches in order to provide more efficient use of computation time in execution datapaths 358a–n of image processor 300. Each of these two mechanisms addresses one of two distinct control needs within image processor 300.

Each execution datapath 358a–n of a single-instruction multiple-data image processor 300 is provided with a respective execution unit 360a–n and local memory 362a–n. Each execution unit 360a–n of execution datapath 358a–n is coupled to its respective local memory 362a–n by way of a respective local memory port 361a–n and to system memory 364 and global memory 366 by way of a respective global memory port 363a–n. Local memory ports 361a–n and global memory ports 363a–n, together, provide each execution datapath 358a–n with a dual port architecture to permit each execution unit 360a–n to access its respective local memory 362a–n simultaneously with data transfer between local memories 362a–n and memories 364, 366. It will be understood that within the dual port architecture of image processor 300, no execution unit 360a–n may directly access any local memory 362a–n except its own.

During execution of instructions, instruction sequence controller 352 of single-instruction multiple-data image processor 300 simultaneously applies the same instruction to every execution datapath 358a–n by way of broadcast instruction line 356. The instructions applied by sequence controller 352 are previously stored in either system memory 364 or global memory 366. The instructions received by sequence controller 352 are applied to sequence controller 352 by way of memory instruction line 356. Within image processor 300, conditional execution permits each datapath 358a–n to execute or not execute a particular issued instruction depending on the state of the local datapath condition flag. Hardware execution masks, residing within execution units 360a–n of image processor 300, permit individual datapaths 358a–n to turn off execution of a sequence of issued instructions for an arbitrary period of time. These two mechanisms permit efficient control of wait stating or idling of execution datapaths 360a–n within single-instruction multiple-data image processor 300, thereby permitting efficient use of execution datapaths 358a–n.

Control over whether an instruction issued by sequence controller 352 is executed or ignored by an individual execution datapath 358a–n is required for data-dependent computation in a single-instruction multiple-data architecture such as the architecture of image processor 300. It is required because each execution datapath 358a–n may have a different value when a test is performed as part of a conditional branch. Thus each execution datapath 358a–n within image processor 300 of the present invention is provided with individual datapath execution masks.

It is equally important to control the sequence of instructions provided by sequence controller 352 to execution datapaths 358a–n by way of broadcast instruction line 356. This control is essential for loops and may also be used to optimize data-dependent execution wherein no execution datapath 358a–n is required to execute a conditional sequence of instructions.

For the purpose of executing a conditional branch within image processing architecture 300, each datapath 358a–n tests the condition of a conditional branch and independently sets its own flags according to its own local determination. Signals representative of these flags are applied by each execution datapath 358a–n to instruction sequence controller 352 by way of flag signal lines 354a–n.

Rather than automatically wait-stating all execution datapaths 358a–n during a conditional, single-instruction multiple-data architecture 300 of the present invention uses the flag signals of flag lines 354 to apply a consensus rule. In the consensus rule of image processor 300, sequence controller 352 does not apply a conditionally executed instruction sequence to broadcast instruction line 356 unless flag lines 354 signal controller 352 that every execution datapath 358a–n requires the instruction sequence.

Both mechanisms, conditional execution and execution masks may be used to implement the conditional execution within image processor 300, when some but not all datapaths 358a–n require it. Of these two mechanisms, execution masks EM are more the general. The execution mask flag is appended to the normal set of local arithmetic condition code flags within each execution unit 360a-n. When an execution mask flag EM is set within an execution unit 360a-n of execution datapaths 358a-n and sequence controller 352 applies the conditional sequence to broadcast instruction line 356, each execution unit 360a-n having its execution mask flag EM set ignores the instructions.

The only exceptions to instructions being ignored by execution datapath 358a-n within image processor 300 when an execution mask flag EM is set are 1) the instruction which restores the state of the previous execution mask flag, and 2) those instructions which unconditionally modify the execution mask flag EM. These instructions are executed by all execution unit 358a-n even if the execution mask flag EM within a datapath 358a-n is set. Thus, if the execution mask flag EM is set in a selected execution unit 360a-n, instructions from instruction sequence controller 352 are ignored by the selected execution unit 360a-n.

It is then possible to encode a conditional thresholding program fragment within single-instruction multiple-data architecture image processor 300 using execution masks EM. This thresholding program is set forth in the instruction sequence of Table III. The instruction sequence of Table III is adapted to perform, within image processor 300, the clipping operation performed by the instruction sequence of Table I within prior art architecture 100. In this instruction sequence a local value v is constrained within a range between the values LOWER_LIMIT and UPPER_LIMIT.

TABLE III

| | |
|---|---|
| CMP v,UPPER_LIMIT; | compare and set flags on all execution datapaths 358a-n |
| MOV EM,LE; | set execution masks EM on execution datapaths 358a-n with less than or equal flag set |
| MOV v,UPPER_LIMIT; | update v only on execution datapaths 358a-n with greater than flags set |
| MOV EM,0; | every execution datapath 358a-n executes unconditional reset of EMs, activating all datapaths 358a-n |
| CMP v,LOWER_LIMIT; | compare and set flags on all execution datapaths 358a-n |
| MOV EM,GE; | set EM on datapaths 358a-n with greater than or equal flag set |
| MOV v,LOWER_LIMIT; | update v on execution datapaths 358a-n with less than flag set |
| MOV EM,0; | reenable every execution datapath 358a-n |

The first instruction of Table III, executed by all execution datapaths 358a-n of single-instruction multiple-data architecture image processor 300, compares the local value of v for each execution datapath 358a-n against the same upper threshold UPPER_LIMIT. The MOV EM,LE instruction of Table III is then executed by all execution datapaths 358a-n of image processor 300. A respective execution mask flag EM is thereby determined within each execution datapath 358a-n according to the comparison of the local v. Each execution datapath 358a-n is thus provided with a respective setting of the flag EM in its individual flag register.

In execution datapaths 358a-n where the less-than-or-equal condition is met, the MOV EM,LE instruction results in the execution mask flag EM being set to the value one. Execution datapaths 358a-n wherein the execution mask flag EM is set to the value one are disabled. These disabled execution datapaths 358a-n ignore instructions applied by sequence controller 352 by way of broadcast instruction line 356. In particular, execution datapaths 358a-n having their execution mask flag EM set to one by the MOV EM,LE instruction of Table III ignore the MOV v,UPPER_LIMIT instruction. In execution datapaths 358a-n where the less-than-or-equal condition is not met, the execution mask flag is set to the value zero. These datapaths 358a-n execute the MOV v, UPPER_LIMIT instruction, thereby clipping any local values of v which were greater than UPPER_LIMIT.

Thus the MOV v,UPPER_LIMIT, is executed only by those execution datapaths 358a-n where the greater-than condition was met in the first instruction of Table III and the execution mask flag EM has the value zero. The fourth instruction of Table III, MOV EM,0, unconditionally resets the execution mask flag EM of all execution datapaths 358a-n of image processor 300 including those execution datapaths 358a-n wherein the execution mask flag EM was set by the CMP v,UPPER_LIMIT instruction. Thus the update of the value of v within the sequence of Table III occurs only in those execution datapaths 360a-n in which it is required and execution mask flags EM of all execution units 360a-n are reset to zero for the next compare instruction. The example of Table III may be simplified using conditional execution as illustrated by the instruction sequence of Table IV.

TABLE IV

| | | |
|---|---|---|
| | CMP v,UPPER_LIMIT | Compare local values of v and set all flags in all execution datapaths 358a-n |
| IF (GT): | MOV v,UPPER_LIMIT | Executed only by execution datapaths 358a-n where local values of v exceed UPPER_LIMIT. |
| | CMP v,LOWER_LIMIT | Set all flags on all execution datapaths 358a-n and compare. |
| IF (LT): | MOV v,LOWER_LIMIT | Executed only by execution datapaths 358a-n where local values of v are less than LOWER_LIMIT. |

Conditional execution within image processor 300 permits every instruction to be executed by each datapath 358a-n based on the data-dependent condition code local to the individual datapath 358a-n. The conditional execution feature of image processor 300 is thus more efficient than prior art architecture, such as prior art architecture 100. However, the method described does not allow for nesting of data dependent execution when using execution masks EM. In these nested execution cases conditional execution may still be used for improved efficiency in the innermost of the nested data dependencies. The two mechanisms are therefore complementary and may be used together to achieve maximum efficiency.

In order to permit nesting, the execution mask is generalized to a stack. In the preferred embodiment of image processing system 300, the execution mask stacks are respective hardware stacks 359a-n residing in each execution unit 358a-n. The push command pushes the local execution mask or condition code of an individual execution datapath 358a-n onto its individual execution mask stack. Push and pop operations are executed by all execution datapaths 358a-n, regardless of whether they are active.

In the case of an inactive datapath 358a-n, the condition code pushed onto the stack 359a-n has the value one, indicating that the inactive datapath 358a-n is off. The remaining active datapaths 358a-n execute the compare against UPPER_LIMIT. The subset of datapaths 358a-n not requiring a clip against UPPER_LIMIT are turned off by the next push operation. Following the clip, a pop restores the prior state and those datapaths 358a-n with clipping enabled are all reenabled for the test against LOWER_LIMIT. Following the similar clipping against LOWER_LIMIT, the final pop operation reenables all datapaths 358a-n. It is necessary for push and pop to execute in all datapaths 358a-n in order to insure the consistency of the execution mask stacks 359a-n.

In the case of a nested conditional, a conditional sequence expression is executed only when some further condition is true. For example, in some applications a determination whether v is within range, similar to the determination of Table V, may be made only if the clipping routine is enabled. This is indicated when the variable enable_clipping is non-zero in the instruction sequence of Table V.

TABLE V

```
local v;
...
v = expression}
if (enable_clipping){
    if (v > UPPER_LIMIT)
        v = UPPER_LIMIT;
    if (v < LOWER_LIMIT)
        v = LOWER_LIMIT;
}
...
```

However, when executing the instruction sequence of Table V it is not possible to merely compare enable_clipping in each execution datapath 358a-n and set the execution mask flag EM accordingly when a MOV EM,0 instruction corresponding to the upper limit test is executed. Because such a setting of the execution mask flag EM would be unconditional, all execution datapaths 358a-n would execute it. This would cause all execution datapaths 358a-n within image processor 300 to become enabled.

Thus, even execution datapaths 358a-n, where enable_clipping was false, would be enabled. Therefore, all execution datapaths 358a-n would perform the subsequent lower limit test, even those that should not perform any clipping of v at all because their clipping routine was not enabled. However, conditional execution and execution masks can both be used to efficiently implement an enabled clipping operation. Additionally, it may be implemented without the use of conditional execution. This is useful for illustrating the generality of the execution mask technique which may be applied to arbitrary levels of nesting.

Conditional execution and execution masks may both be used to efficiently implement the example with enabled clipping as shown in Table VI.

TABLE VI

| | | |
|---|---|---|
| CMP ENABLE,0 | | |
| MOV EM,EQ | | Disable execution |

TABLE VI-continued

| | | |
|---|---|---|
| | | datapaths 358a-n where clipping is not enabled |
| | CMP v,UPPER_LIMIT | Compare and set all flags on all execution datapaths 358a-n |
| IF (GT): | MOV v,UPPER_LIMIT | Executed only by execution datapaths 358a-n where local values of v exceed UPPER_LIMIT |
| | CMP v,LOWER_LIMIT | Compare and set all flags on all execution datapaths 358a-n |
| IF (LT): | MOV v,LOWER_LIMIT | Executed only by execution datapaths 358a-n where local values of v are less than LOWER_LIMIT |
| | MOV EM,0 | Reenable all execution datapaths 358a-n |

This example can also be implemented without the use of conditional execution as shown in Table VII. This illustrates the generality of the execution mask technique which may be applied to arbitrary levels of nesting.

TABLE VII

```
CMP ENABLE,0
PUSH EM,EQ
    CMP v,UPPER_LIMIT
    PUSH EM,LE
        MOV v,UPPER_LIMIT
    POP
    CMP v,LOWER_LIMIT
    PUSH EM,GE
        MOVE v,LOWER_LIMIT
    POP
POP
```

Referring now to FIGS. 4A–D, there are shown execution mask stack maps 402, 404, 406, and 408, representing execution mask stacks 359a-n. Stack maps 402, 404, 406, and 408 schematically illustrate portions of execution units 360a-n within execution datapath 358a-n of image processor 300. As previously described, in the preferred embodiment of execution units 360a-n, dedicated hardware is provided within execution units 360a-n to perform the functions of stacks 359a-n. Execution mask flag stack 359i of datapath 358x, where $1 \leq x \leq n$, contains y execution mask flags, where execution mask flag EMx.1 is the first execution mask pushed onto mask stack 359x, EMx.2 is the second mask pushed onto execution mask flag stack 359x, and so on.

In general, an expression that sets an execution mask flag EMx.y may be coded to work correctly in any nested conditional, such as the conditional in the instruction sequence of TABLE VI, by saving the state of execution mask flag EMx.y in a temporary locution at the beginning of the expression and restoring it at the end. Execution mask flag stacks 359a-n are provided for this purpose within respective execution units 360a-n of datapaths 358a-n.

It will be understood by those skilled in the art that the index x identifies a particular execution datapath 358a-n having an execution mask stack 359x within execution unit 360x and that the index y represents the number of masks stacked in execution mask stack 359x. Thus single-instruction multiple-data image processor 300 of the present invention provides execution mask flag stacks 359a–n for sequentially storing and sequentially retrieving execution mask flags EMx.y within each execution unit 360a–n of each execution datapath 358a–n.

When the first instruction of the sequence of Table VII, CMP ENABLE,0, is executed, the equal flag of execution datapath 358a–n and the equal flag of execution datapath 358n are set because the user has defined them to be enabled. Execution masks EMa.1, EMb.1, and EMn.1, appear in mask stacks 359a,b,n respectively within execution units 360a,b,n when the next instruction, PUSH EM,EQ, is executed by datapaths 358a,b,n.

Because datapath 358a and datapath 358n of execution mask stack map 402 are enabled, execution mask EMa.1 in execution mask stack 359a and execution mask EMn.1 in execution mask flag stack 359n have a value of zero. This permits execution datapaths 358a,n to execute instructions from sequence controller 352. Execution mask EMb.1, the first mask in execution mask stack 359b, has the value one because the user has previously defined datapath 358b to be disabled. Because execution datapath 358b is disabled, it does not execute instructions from sequence controller 352.

The next instruction of the instruction sequence of Table VII, CMP v,UPPER_LIMIT, is a nested data dependency. It causes some datapaths 358a–n which execute it to set the LE flag according to the local value of v. Other datapaths 358a–n which execute this instruction do not set the LE flag. Furthermore, some datapaths 358a–n do not execute the instruction at all. For example, execution datapath 358b does not execute the instruction because the top most mask stacked in execution mask stack 359b, EMb.1, has a value of one. Execution datapath 358a and execution datapath 358n do execute the comparison instruction because their top most execution masks, EMa.1 and EMn.1, both have the value of zero.

When execution datapaths 358a,n execute the comparison and the instruction PUSH EM,LE, they each push a new execution mask, EMa.2 and EMn.2. These new execution masks are stored in their respective execution mask stacks 359a,n of the new execution mask stack map 404. A further execution mask EMb.2, having the value one, appears on stack 359b within execution unit 360b of datapath 358b. Because datapath 358b is inactive the disabling execution mask is merely reproduced by the push operation.

For the purposes of illustration, consider the case wherein the results of the upper limit comparison are such that execution datapath 358a must clip its local value of v while the local value of v of execution datapath 358n is not above the range and does not require clipping. In this case execution mask flag EMa.2, pushed onto mask stack 359a, has the value of zero, and execution mask EMn.2, pushed onto mask stack 359n has the value one. Thus, during the execution of the next instruction, wherein the upper limit is moved to the local value of v, execution datapath 338a is active and performs the move, thereby clipping the value of v local to datapath 358a. During this instruction cycle execution datapaths b,n are inactive and do not perform the move, although they were inactivated at different points within the instruction sequence of TABLE VII.

During the execution of the next instruction, POP, execution masks EMa.2, EMb.2, and EMn.2 are removed from mask stacks 359a,b,n respectively as shown in execution mask stack map 406. The top most execution mask in mask stack 359n, EMn.1, has a value of one as previously determined by the enable comparison. Thus, by stacking execution masks EMn.1 and EMn.2 within stack 359n of execution datapath 358n, execution of datapath 358n was disabled during a nested loop and reenabled at the end of the nested loop. More generally, all execution datapaths 358a–n within single instruction multiple data video processor architecture 300 are able to idle or inactivate according to local data dependencies during a nested loop. Upon leaving the nested loop, each execution datapath 358a–n may restore its execution mask status to its status prior to entering the loop. The POP instruction which follows then clears all execution masks EMi.1, as pushed onto execution mask stacks 359a–n by the PUSH instruction as shown in execution mask stack map 408.

It will be understood that the example of Table VII, as illustrated by execution mask stack maps 402, 404, 406, and 408, may occur embedded within a further instruction sequence (not shown). Instructions within the further instruction sequence may have pushed a plurality of flags onto mask stacks 359a–n previous to the first PUSH instruction of Table VII. Therefore the final POP instruction of Table VII may restore a previous execution mask status for execution datapaths 358a–n for further execution by image processor 300.

Each execution mask flag stack 359a–n within its respective execution datapath 358a–n thus provides automatic storage for execution mask flags EMx.y in image processor 300 of the present invention. In this method, execution mask flags EMx.y are pushed onto execution mask flag stacks 359a–n of execution datapaths 358a–n. When execution mask flags EMx.y are pushed onto stacks 359a–, an operation may be performed by selected execution units 360a–n, and execution mask flags Emx.y may then be popped off stacks 359a–n. Stacks 359a–n containing execution masks EMx.y within each execution datapath 358a–n of single-instruction multiple-data architecture 300 may have any number of entries. For example, execution datapaths 358a–n of image processor 300 may be provided with stacks 359a–n having sixteen or thirty-two entries.

The execution mask discipline described thus far provides a way to control, within an individual execution datapath 358a–n, the conditional execution of an instruction issued by sequence controller 352 of single-instruction multiple-data architecture 300. However, this execution mask discipline does not provide a way to conditionally control the sequence of instructions issued by sequence controller 352 during a conditional branch. For example:

```
local j;
for (j=0 j<NUMBEROFBLOCKS; j=j+4) {
    . . .
}
```

The following instruction sequence of Table VIII performs this operation.

TABLE VIII

| | | |
|---|---|---|
| | MOV j,0; | initialize induction |
| L1: | CMP j,NUMBEROFBLOCKS; | variable test for end |
| | JGE L2 | condition exit if condition met by all active |
| | MOV EM,GE | datapaths 358a-n turns off those datapaths |

TABLE VIII-continued

|  | 358a-n meeting exit condition |
|---|---|
| .... |  |
| ADD j,4; | increment j |
| JMP L1; | go back for more |
| L2. | finished |

In the instruction sequence of Table VIII a copy of the local loop induction variable j exists in all execution datapaths 358a–n. The operation CMP j,NUMBEROF-BLOCKS individually sets the execution mask flags EMx.y of each execution unit 360a–n according to the local value of j. Because all execution datapaths 358a–n initialize j to the same value of zero and perform the same operation, ADD j,4, upon j, the execution mask flags EM of all execution datapaths 358a–n should be identical.

Since each execution datapath 358a–n may have a different number of blocks to process, the value NUMBEROFBLOCKS may vary from one execution datapath 358a–n to another. The instruction sequence for the loop is executed only if at least one datapath has an index j less than NUMBEROFBLOCKS. Prior to executing the loop, those execution datapaths 358a–n which meet the exit condition are turned off by MOV EM,GE. When only a single execution datapath 358a–n is enabled within image processor 300, the enabled execution datapath 358a–n behaves like a conventional uniprocessor.

The consensus rule of image processor 300 allows the easy coding of a conditional program fragment that may be jumped over by all execution datapaths 358a–n if no execution datapath 358a–n requires the execution of the fragment. For example, occasionally v is negative. A very complex calculation requiring a great deal of processing time is required within execution units 360a–n when v is negative. If the calculation required for a negative v is sequenced, even if no execution datapath 358a–n requires it, extremely inefficient use is made of the processing power within single-instruction multiple-data architecture 300. Therefore, using the consensus rule, sequence controller 352 does not apply the instructions required for a negative v to broadcast instruction line 356 for transmission to execution datapaths 358a–n if no datapath 358a–n is processing a v having a negative value.

It is important to note that the consensus rule is complete. The dual to branching if all execution datapaths 358a–n satisfy the condition code ("if all") is to branch if any execution datapath 358a–n satisfies the condition code ("if any"). It is illustrated below how the branch "if any" function may be implemented using the branch "if all" type of branch. The duals to all condition codes are included within single-instruction multiple data image processor 300 which makes the "if any" function simple to code.

As previously described, each execution datapath 358a–n within single-instruction multiple-data image processor 300 is equipped with large local memory 362a–n. Each execution unit 360a–n of each respective execution datapath 358a–n directly accesses its own local memory 362a–n by way of a respective dual port 361a–n or program port 361a–n. Each dual port 361a–n or local memory port 361a–n of image processor 300 is provided with an both A port and a B port. Different signals may be transmitted between each execution unit 360a–n and its local memory 362a–n simultaneously by way of the A and B ports under the control of the program being executed within execution units 360a–n. It will be understood that this transfer by way of local memory ports 361a–n is distinguished from transfers by way of transfer ports 363a–n under the control of block transfer controller 368.

It will be understood that this type of access to local memories 362a–n by execution units 360a–n involves writing of pointers only. Thus these operations are not actually random accessing of local memories 362a–n. This ability of block transfer controller 368 permits split phase transactions as shown in processing/memory time line 500. These split phase transactions are completely independent of instruction sequencer 352. Thus, block transfer controller 368 operates as a separate instruction engine not directly controlled by instruction sequence controller 352. This allows efficient access to memory for the instruction cache. It permits the cache to be filled quickly even if another block is getting instructions from external memory 364, 366. Therefore, block transfer controller 368 minimizes idling or wait stating of execution datapaths 358a–n while waiting for instructions.

It will be understood by those skilled in the art that conventional imaging processing systems usually provide processor consistency wherein instructions are executed in the order that they are requested from memory. It will also be understood that single-instruction multiple-data image processor 300 of the present invention is provided with weak processor consistency because block transfer controller 368, functioning as a separate instruction engine, can cause certain memory read requests to pass other memory requests.

As also previously described, access to global memory 366 is shared by all execution datapaths 358a–n within single-instruction multiple-data image processor 300. However, global memory 366 is not directly accessed by execution units 360a–n. Rather, execution units 360a–n access global memory 366 by way of memory interface 370 and global port 376 under the control of block transfer controller 368 and control line 378. Thus a selected port 363a–n may be coupled to global memory 366 by way of port 376. Furthermore, external global memory 366 may be global only in a conceptual sense within image processor 300. All that is required is that any execution datapath 358a–n can read or write any location in external global memory 366 by way of its external global memory port 363 and that external global memory 366 be external to execution datapaths 360a–n.

Within single-instruction multiple-data architecture 300 there is provided an improved method to more efficiently read blocks of data from system memory 364 and global memory 366 into local memories 362a–n by way of global memory port 363a–n, operate on the data within local memories 362a–n by way of lines 340, 332, 344, and write the results back to global memory 366, again by way of global memory port 363. In order to accomplish these more efficient block read and block write operations, single-instruction multiple-data image processor 300 is provided with block transfer instructions and block transfer architecture. The instructions and architecture are adapted to optimize the movement of data between local execution units 360a–n, local memories 362a–n and global memory 366. These input/output operations within single-instruction multiple-data image processor 300 are handled by autonomous synchronous block transfer controller 368.

Block transfer controller 368 within single-instruction multiple-data image processor 300 allows the transfer of two-dimensional arrays which are conformally displaced. This allows a subblock of a larger image to be copied in a single block operation for example. In general, using source and destination bit maps, conformally displaced blocks may be transferred even though they do not have the same aspect ratio or alignment in physical memory.

The specification for a block transfer operation initiated by a program within image processor 300 is actually a set of lists of individual block transfers. Each enabled execution datapath 358a–n builds a list of block transfer commands in its local memory 362a–n. A single block transfer initiate instruction eventually leads to the processing of all block transfer commands from the lists of every enabled execution datapath 358a–n. In addition, up to two sets of transfer lists can be pending at any time.

Referring now to FIG. 5, there is shown processing-/memory time line 500. As illustrated by processing-/memory time line 500, all block transfer operations within single-instruction multiple-data architecture 300 are split-phase transactions that occur concurrently with program execution. That is, a first program may perform a transfer during memory read block time segment 504 and perform processing during processing time segment 502. Overlapping with processing time segment 502, a second program may perform a transfer during memory read block time segment 506.

Referring now to FIG. 6, there is shown a schematic representation of the parameters that specify a memory-to-memory block transfer between global memory 366 and local memories 362a–n. It will be understood by those skilled in the art that while the schematic representation herein sets forth a transfer between global memory 366 and local memories 362a–n, the following discussion applies equally to transfers between system memory 364 and local memories 362a–n. This transfer takes place under the control of block transfer controller 368 within single-instruction multiple-data architecture image processor 300 of the present invention. It is possible to specify, for a single transaction, two-dimensional blocks 602a,b that are part of larger two-dimensional frame arrays 600a,b. Two dimensional frame arrays 600a,b may, respectively, reside within global memory 366 and within a selected local memory 362a–n.

Source frame 600a and source block 602a need not have the same aspect ratio as destination frame 600b and destination block 602b during memory-to-memory block transfers within image processor 300. However, the total number of elements and the width of source block 602a must be equal to the total number of elements and the width of destination block 602b.

In the block transfer request of image processor architecture 300 a set of block transfers is described by encoding the block transfer parameters in local memory 362a–n of each enabled execution datapath 358a–n. The block transfer is started by applying an initiate instruction to block transfer controller 368 by execution datapaths 360a–n by way of transfer control bus 344. It will be understood by those skilled in the art that this applying of the initiate instruction to block transfer controller 368 by way of transfer control bus 344 comprises posting of the transfer.

Figure 7:
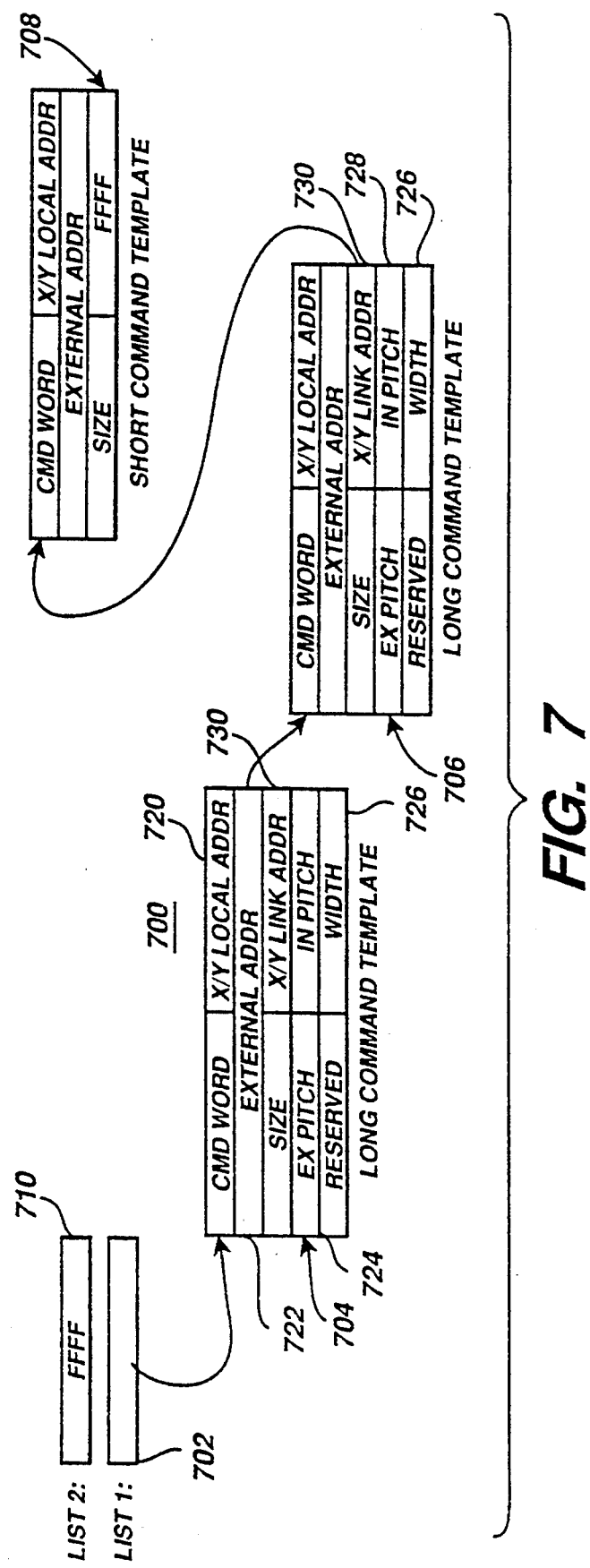
FIG. 7 shows a linked request list formed of command templates linked to each other and containing the parameters required to specify a memory-to-memory block transfer such as the transfer represented by FIG. 6.

Referring now to FIG. 7, there is shown block transfer linked request list 700 containing a plurality of block transfer command templates 704, 706, 708 for initiating and specifying block transfers within single-instruction multiple-data image processor 300 of the present invention. Short block transfer command template 708 is an abbreviated form of long block transfer command templates 704, 706. Block transfer controller 368 uses default values for the pitch and width of specified memory blocks in order to permit the use of short command template 708 which specifies less transfer information than long command template 706. After posting a memory transfer, block transfer controller 368 fetches a command template such as long command template 704 or short command template 708 in order to perform the requested transfer.

If fetched command template 704 is part of a linked list containing further long command template 706 linked to fetched template 704, further template 706 is read after completion of the transfer performed under the direction of fetched template 704. Block transfer controller 368 then performs a further transfer according to further command template 706. Likewise, after the transfer specified by further command template 706 is completed, short command template 708 is fetched because short command template 708 is linked to command template 706.

Execution datapaths 358a–n maintain a status flag for each initiated block transfer operation in order to perform the completion check required for transfers under the control of block transfer controller 368. Each execution datapath 358a–n of image processor 300 may then check for the transfer to be completed by examining the associated status flag maintained by execution datapath 358.

Linked request list 700 within local memory 362a–n of single-instruction multiple data architecture 300 is thus a linked list of block transfer command templates 704, 706, 708. Each command template 704, 706, 708 in linked request list 700 specifies the parameters for a programmed block transfer of data between local memory 362a–n and system memory 364 or global memory 366 of image processor 300. These parameters may be specified explicitly, implicitly or may be determined by default.

For example, internal address field 720 of linked request list 700 may specify a starting address 604 of two-dimensional block 602b within two-dimensional frame array 600b. Two-dimensional frame array 600b resides in the same local memory 362a–n as linked request list 700. External address field 722 of long command templates 704, 706, 708 specifies a destination starting external address 606. External address 606 is the starting address of two-dimensional block 602a within two-dimensional frame array 600a.

Long command templates 704,706 also contain pitch information for permitting block transfer controller 368 to perform memory-to-memory transfers within single-instruction multiple-data image processor 300. External pitch field 724 of long command templates 704, 706 specifies the external pitch of two-dimensional frame array 600a. Internal pitch field 728 of long command templates 704, 706 specifies the internal pitch of two-dimensional frame array 600b. Short command template 708 is not provided with external pitch field 724 or internal pitch field 728. The width of both two-dimensional blocks 602a,b is stored in pitch field 728.

Link address field 730 of long command template 720 points to long command template 706. The link address field 730 of long command template 706 in turn points to short command template 708. Note that, in addition to external pitch field 704 and internal pitch field 728, width field 726 of long command templates 704, 706 is not present in short command template 708.

Thus, linked request list 700 within image processor 300 is a specification for a series of individual block transfers by block transfer controller 368. Linked request list 700 of each datapath 358a–n is constructed by its respective execution unit 360a–n in its respective local memory 362a–n. The links in linked request list 700 point to the next template 704, 706, 708 in list 700. Templates 704, 706, and 708 are all resident within local memory 362a–n of the same execution datapath 358a–n. A transfer list 700 may be terminated by setting the address in link field 730 of the last valid command template to some suitable end-of-list indication.

Each enabled execution datapath 358a–n of architecture 300 supplies its linked request list 700 to block transfer controller 368 for a transaction. There may be up to two block transfer request lists 700 simultaneously initiated by each execution datapath 358a–n. In general the number of linked request lists 700 in a transaction controlled by block transfer controller 368 may be up to two times the number of enabled execution datapaths 358a–n.

Memory address 702 of first command template 704 in linked transfer list 700 within local memory 358a–n is always located at the root pointer register of an associated execution unit 360a–n. A microinstruction that posts a block transfer identifies either first linked list 702 or second linked list 710 as corresponding to the root pointer for the transfer. Each enabled execution datapath 358a–n of image processor 300 has its own valid transfer list 700 in place when a transfer is posted.

All of the block transfers for an initiate instruction under the control of block transfer controller 368 within image processor 300 must be completed before any transfer is processed for any later initiate instruction. This first-in, first-out ordering is essential to maintain the sequential semantics of the single instruction stream of single-instruction multiple-data image processor 300 of the present invention. Thus, if one initiate posts a write to system memory 364 or global memory 366 and the next initiate posts a read of system memory 364 or global memory 366, it is guaranteed that, regardless of the order in which each of the individual datapaths 358a–n are seized, all writes are finished before any read begins. This rule requires only that sets of transfers be initiated and completed in order. This rule does not preclude buffering multiple requests.

As previously described, each local memory 362a–n within single-instruction multiple-data image processor 300 is provided with dual port architecture. One port of the dual port architectural is global memory port 363a–n or external memory port 363a–n. Global memory port 363a–n of each local memory 362a–n is dedicated to data transfers between local memory 362a–n and system memory 364 or global memory 366. Global memory ports 363a–n are formed by transfer control lines 340, 342, and 344.

The other port of the dual port architecture of each local memory 362a–n of image processor 300 is local memory port 361a–n. Local memory port 361a–n is dedicated to transfers between local memories 362a–n and execution units 360a–n. Local memory port 361a–n of the dual port architecture of system 300 is formed of two separate ports, an A port and a B port. Transmission of data by way of the program port of local memory ports 361a–n is under the control of the instructions issued by sequence controller 352 having instruction memory 380. As a result, single-instruction multiple-data architecture 300 can support access to global memory 366, including block transfers, while simultaneously continuing execution within execution units 360a–n.

For example, memory read block time segment 506 of processing/memory time line 500 is simultaneous with processing time segment 502 for its entire duration. This is accomplished by converting the read and write operations of single-instruction multiple-data image processor 300 into split phase transactions comprising an initiate operation and a transfer complete synchronization. This capability is essential for sustaining the high external global memory bandwidth required by video signal processing applications.

Thus an initiate instruction only initiates the block transfer operation while sequence controller 352 continues to issue instructions to execution units 360a–n while the transfer takes place. It will be understood by those skilled in the art that a program executing within execution units 360a–n of image processor 300 must resynchronize with global memory 366 or external memory 366 after completion of the transfer by block transfer controller 368.

In order to simplify the following example, the instruction sequence of Table IX is written for image processor 300 having a single execution datapath 358a.

TABLE IX

```
/* wait for the first block to be read into temp_block1 */
start_read_block(original_image[0],temp_block1);
io_wait();
/* initiate read of next block into temp_block2 */
start_read_block(original_image[1],temp_block2);
    for (k = 0; k < NUMBEROFBLOCKS; k = k + 2);
        /* transform two blocks per iteration */
        DCT_block(temp-block1);
        io_wait();
        start_write_block(xform_image[k], temp_block1);
        start_read_block(original_image[k+2],temp_block1);
        DCT_block(temp_block2);
        io_wait();
        start_read_block(xform_image[k+1],temp_block2);
        start_read_block(original_image[k+3],temp_block2);
    };
```

The instruction sequence of Table IX uses a straightforward double buffering technique. In this double buffering technique, while temp_block1 within local memory 362a is transformed, temp_block2 within local memory 362a is loaded with the next block from global memory 366. After the transform of the first block is completed, a write of the transformed data of block1 from local memory 362a to global memory 366 is initiated. This is followed by a read of the next data from global memory 366 for block1. Execution of the instruction sequence of Table IX then advances to transforming temp_block2 simultaneously with writing the results of temp_block1 back to global memory 366. The new read of temp_block2 from global memory 366 proceeds in parallel with this write of temp_block1.

The io_wait() of Table IX causes sequence controller 352 to wait until all input/output transfers have been completed within execution datapaths 358a–n before proceeding. This guarantees that a previously initiated read or write by execution unit 360a–n is no longer using the source block and that the contents of the destination block are valid. In general, the io_wait() is implemented in image processor 300 with a conditional branch instruction which tests the block transfer done flag local to each execution datapath 358*a-n*.

As previously described, processing/memory time line 500 is a representation of the processing and memory accesses of the multibuffered input/output of single-instruction multiple-data image processor 300. The latency of input/output transfers are hidden by the overlapped computation on the blocks. For example, consider the blockwise discrete cosine transform of an image within the architecture of single-instruction multiple-data image processor 300. The basic discrete cosine transform algorithm has considerable parallelism. The image to be transformed is tiled by a set of uniformly sized blocks and the discrete cosine transform is independently computed over each of the blocks. Because there are no data dependencies among the individual block transforms, all sets of block transforms may be computed in parallel by parallel execution datapaths 358*a-n*.

Figure 8:
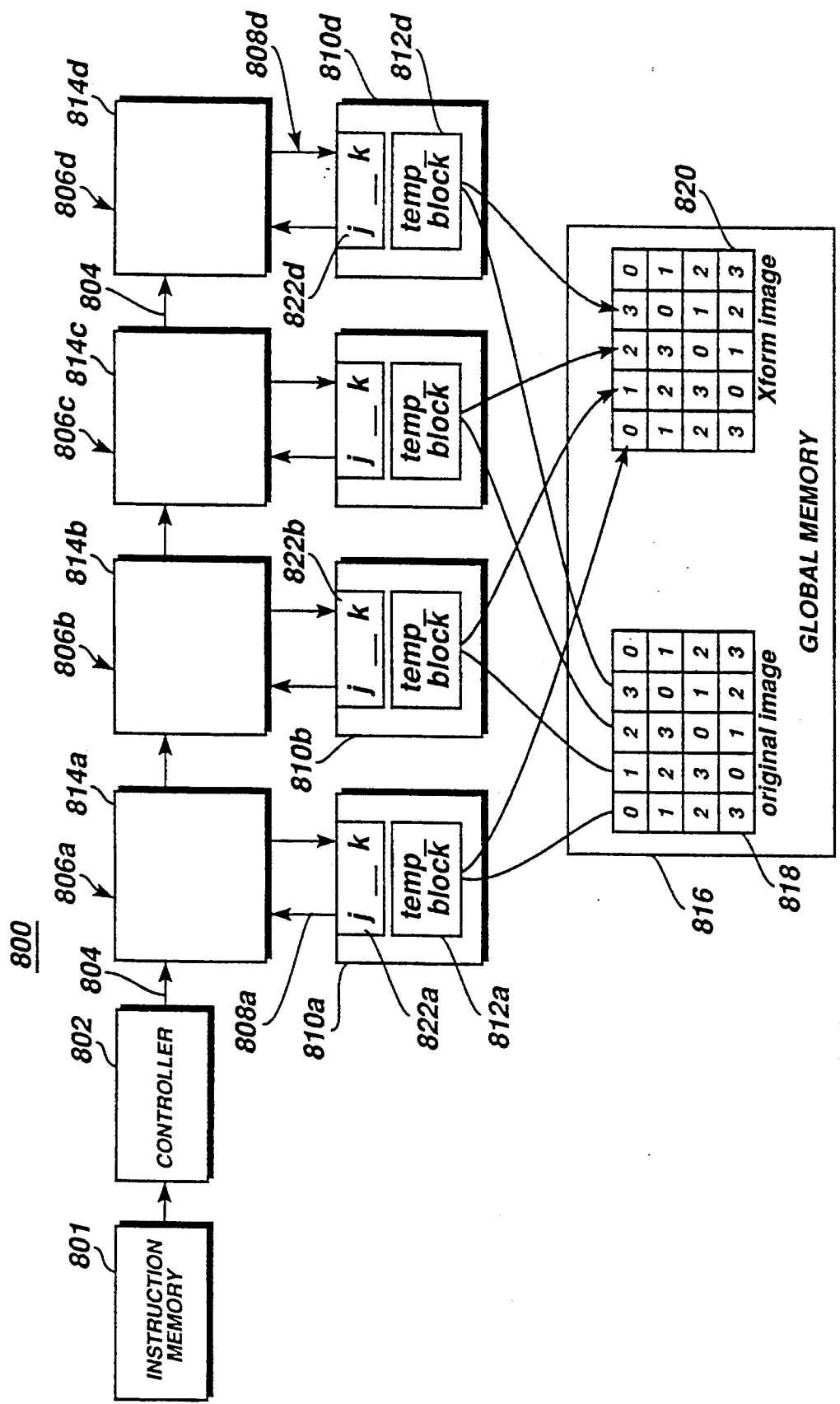
FIG. 8 shows a simplified alternate embodiment of the single-instruction multiple-data architecture image processor of FIG. 3, wherein there is provided a four-execution datapath architecture.

Referring now to FIG. 8, there is shown single-instruction multiple-data image processor 800 having four execution datapaths 806*a-d*. Single-instruction multiple data image processor 800 is an alternate embodiment of image processor 300. Sequence controller 802 of image processor 800 applies instructions from instruction memory 801 to execution units 814*a-d* of execution datapaths 806*a-d* by way of instruction broadcast line 804. When performing block transfer and block transform operations, single-instruction multiple-data architecture 800 has the simplification of a single instruction stream as previously described with respect to single-instruction multiple-data image processor 300.

The instruction sequence of Table X may be provided within instruction memory 801 to program image processor 800 to perform a blockwise discrete cosine transform of original image memory block 818 stored in global memory 816 to provide a transform image stored in transformed memory image block 820. As also previously described, the instruction sequence of Table X is executed simultaneously by all execution datapaths 806*a-d* of four execution datapath image processor 800.

The instruction sequence of Table X may perform the discrete cosine transform required within the instruction sequence of Table IX. The discrete cosine transform instruction sequence of Table X is sequential except that the outer loop j is executed only one-fourth as many times as the inner loop k. This is due to the fourfold parallelism of execution datapaths 806*a-d*. The loop induction variable, j, of the outer loop takes the values 0,4,8. . .

TABLE X

```
DCT_Image:
    global int original_image[ ], xform_image [ ];
    local int j, k, temp_block[BLOCKSIZE];
    for (j = 0; j <NUMBEROFBLOCKS;j = j + 4) {
        k = j + THIS_DP_NUMBER;
        read_block (original_image[k], temp_block);
        DCT_block(temp_block);
        write_block(xform_image[k], temp_block);
    };
```

The value of the constant THIS_DP_NUMBER, which is used to determine the loop induction variable k, depends upon which execution datapath 806*a-d* is performing the operation. This permits each execution datapath 806*a-d* of image processor 800 to select a different block number, k, to process by adding the execution datapath-dependent value THIS_DP_NUMBER to the value of j. Thus the constant THIS_DP_NUMBER, which is unique to each execution datapath 806*a-d*, is equal to zero for execution datapath 806*a*, one for execution datapath 806*b*, etc. Execution datapath 806*a* therefore processes block numbers k=0,4,8 . . . of original memory image block 818 from global memory 816, while execution datapath 806*b* processes blocks k=1,5,9 . . . etc.

All execution datapaths 806*a-d* copy their assigned blocks k into their respective temp_block 812*a-d*, a temporary array in local memory 810*a-d* of each execution datapath 806*a-d*. The assigned blocks of original image memory block 818 copied from global memory 816 into respective local memories 810*a-d* are then transformed by the respective execution units 814*a-d* of execution datapaths 806*a-d*. The resulting transformed blocks within each execution datapath 806*a-d* are then copied back to transformed memory image block 820 within global memory 816. While original image block 818 and transformed image block 820 are in shared global memory 816, the four sets of values of the loop induction variables i and k reside in respective memory locations 822*a-d*. Memory locations 822*a-d* for storing the local values of i and k are provided in each local memory 810*a-d* of each execution datapath 806*a-d*, along with the local values of temp_block 812*a-d*.

In addition to the simplicity of a single instruction stream like that of conventional sequential processors (not shown), single-instruction multiple-data image processor 800 provides significant efficiency advantages for those algorithms that may be optimized for single-instruction multiple-data systems. In addition to the economics of sharing single sequence controller 802 and associated instruction memory 801, an important advantage is the synchronization of multiple execution datapaths 806*a-d*. For example, during the blockwise discrete cosine transform of the instruction sequence of Table X, it is easy to determine when all execution datapaths 806*a-d* have completed a current set of block transforms. The block transforms are completed when the last instruction in the block transform code has executed.

A very important feature of single-instruction multiple-data image processor 300 is block transfer controller 368. Block transfer controller 368 performs conflict resolution and controls the flow of data within image processor 300. It prioritizes block transfers of data from global memory 366 to local memories 362*a-n* when requested by execution units 360*a-n*. Block transfer controller 368 also generates addresses and controls for transfers from local memories 362*a-n* to global memory 366 or system memory 364.

The functions performed by block transfer controller 368 during block data transfers of data between global memory 366 and local memories 362*a-n* include arbitration of transfer requests of competing global memory 366 and execution units 360*a-n*, address generation and control for two-dimensional block transfers between global memory 366 and local memories 362*a-n*, control for scalar, first-in first-out, and statistical decoder transfers between local memories 362*14 n* and global memory 366 and address generation and control for block instruction load following cache miss.

A number of different types of transfers requiring input/output access arbitration by block transfer controller 368 may take place between global memory 366 and local memories 362*a-n*. These include fetching instructions from global memory 366. Image processor system 300 initializes the process by downloading instructions from system memory 364 to global memory 366. On power up of image processor 300 the instructions are loaded from system memory 364 or global memory 366 into the controller.

The different types of transfer may be prioritized by block transfer controller 368 as follows, proceeding from highest priority to lowest priority: (1) instruction, (2) scalar, first-in, first-out and statistical decoder, and (3) block transfer. Thus block transfer controller 368 not only prioritizes and arbitrates within image processor 300 based upon whether a request is an instruction type of request or a data type of request. Block transfer controller 368 also prioritizes and arbitrates based upon the subtypes of data.

In order to handle higher priority transfers while suspending lower priority transfers, the transfer having higher priority is allowed to gain access to transfer data bus 340 of global memory ports 363a-n at the next available memory cycle boundary. After the completion of the higher priority transfer, the suspended lower priority transfer is resumed. Thus it will be understood that single-instruction multiple-data image processor 300 of the present invention is provided with weak processor consistency. In the weak processor consistency of image processor 300 input/output operations are not necessarily executed in the order in which they are applied to execution units 360a-n.

Block transfer controller 368 supports multiple levels of suspension. For example, a block transfer within image processor 300 may be interrupted by a scalar access, which may be interrupted by an instruction load. In this case, block transfer controller 368 suspends the block transfer at the next available memory cycle boundary and starts performing the scalar access. When the cache miss occurs, the scalar access is interrupted at the next memory cycle boundary and the block of instructions is fetched. After the instruction fetch is complete, block transfer controller 368 resumes the scaler access starting with the last execution unit 360a-n serviced. Upon completion of servicing of all the scaler accesses posted, the block transfer is resumed.

When execution units 360a-n require data, they assert a request flag on line 340 to block transfer controller 368. Block transfer controller 368 then arbitrates the requests from the competing execution units 360a-n, and grants an execution unit 360a-n access to the bus. The execution unit 360a-n which was granted access by block transfer controller 368 retains control of the bus until completion of the transaction unless a request of higher priority is posted by a different execution unit 360a-n.

Block transfer controller 368 services all requests posted at the same time by an execution unit 360a-n before starting the request of another execution unit 360a-n. In order to ensure that no execution unit 360a-n is locked out by posting of an intervening transfer, block transfer controller 368 uses a serial polling scheme to service requests from the competing execution units 360a-n. In this serial polling scheme the last execution unit 360a-n serviced by block transfer controller 368 is not eligible for servicing by controller 368 again until outstanding requests of all other execution unit 360a-n have been serviced.

The two-dimensional block transfer method within single-instruction multiple-data image processor 300 is a direct memory access mechanism for moving one or several rectangular images of arbitrary size between global memory 366 and local memories 362a-n. The operation of the two-dimension block transfer by block transfer controller 368 is autonomous with respect to program execution by execution units 360a-n of single-instruction multiple-data image processor 300. Synchronization between the program being executed by execution units 360a-n and the block transfer operation controlled by block transfer controller 368 is accomplished by two interactions the transfer request and the completion check.

As previously described, single-instruction multiple-data image processor 300 is provided with a linked list structure 700 to specify block transfer operations to block transfer controller 368. Each such block transfer linked request list structure 700 for specifying transfers to controller 368 within image processor 300 is provided with a root pointer and one or more block transform command templates 704, 706, 708. Two linked request lists 700 are supported for each execution unit 360a-n, each request list 700 of an execution unit 360a-n having its own set of one or more command templates 704, 706, 708. The programmer of image processor 300 constructs and stores linked request lists 700 in local memories 362a-n prior to initiating a transfer under the control of block transfer controller 368. When a block transfer is initiated by an active execution unit 360a-n, only active execution units 360a-n within image processor 368 are serviced.

In order to provide linked request list 700 within local memories 362a-n, a user of single-instruction multiple-data image processor 300 writes to root pointer registers (not shown) within execution datapaths 358a-n. Additionally, the user writes command templates 704, 706, 708 into local memories 362a-n to set up the required block transfer by block transfer controller 368. The root pointer register holds the starting address of first command template 704 in each execution unit 360a-n.

Command template 704, which contains the description of the first two-dimensional transfer, varies from one execution datapath 362a-n to another within image processor 300. Because multiple command templates 704, 706, 708 may be connected in linked request list 700, as previously described, and two linked lists 700 may be supported, the transfer of multiple independent blocks of data between global memory 366 and local memories 362a-n within datapaths 358a-n of image processor 300 under the control of block transfer controller 368 may thus be initiated by a single instruction.

As previously described, there are two types of command templates, long command templates 704, 706 and short command template 708. The information within short command template 708 is a subset of the information within long command template 704. Within block transfer controller 368 there are three default registers: the default external pitch register, the default internal pitch register and the default width register. When using long command template 704, or long command template 706, block transfer controller 368 uses the pitch and width value specified fields 724, 726 of long command templates 704, 706. When using short command template 708, block transfer controller 368 uses the pitch and width values specified in default registers. The default register contents may be modified by the user of single-instruction multiple-data image processor 300. When the user performs this modification of the default registers, the default register contents may be updated to contain new external pitch parameters, internal pitch parameters and width parameters as specified by the user.

Prior to initiating a block transfer by block transfer controller 368, the user of single-instruction. multiple-data image processor 300 must check a block transfer done bit to determine that the previous block transfer is completed. Initiation of a block transfer without checking the previous transfer block done bit may cause indeterminate results as previously described. After the previous block transfer is completed and the done bit is set, the user may set a block transfer request bit in block transfer controller 368. This is done by a block transfer initiation instruction. The done bit is cleared as soon as the block transfer is initiated. Several active execution units 360a–n may request block transfers and block transfer controller 368 may arbitrate among active execution units 360a–n to start the block transfers.

After a block transfer is initiated, block transfer controller 368 executes the block transfer sequences starting with execution unit 360a. Block transfer controller 368 fetches the root pointer address of first command template 704 from execution unit 360a if execution unit 360a is active. Block transfer controller 368 uses this root pointer address to load first command template 704 of linked request list 700 of execution unit 360a. After command template 704 is loaded, block transfer controller 368 transfers a memory block between local memory 362a and global memory 366 according to the specifications within command template 704.

When the first block transfer is completed, according to command template 704, block transfer controller 368 uses link address field 730 of command template 704 to fetch next command template 706 of linked request list 700 of execution unit 360a. Execution of the next block transfer according to command template 706 is then performed. Once block transfer controller 368 loads a link address field 728 having a null, the next active execution unit 360b–n is serviced by block transfer controller 368. The root pointer register of next active execution unit 360b–n is used to fetch the first link address.

When block transfer controller 368 completes linked request lists 700 of all active execution units 360a–n within single-instruction multiple-data image processor 300, a block transfer done condition bit is set. When one set of linked request lists 700 within local memories 362a–n of active datapaths 360a–n is completed in this manner, block transfer controller 368 is prepared to service another set of linked request lists 700 when initiated by execution units 360a–n.

Two block transfer done bits are therefore required in the condition code register (not shown) of each execution datapath 360a–n. One block transfer done bit is provide for each of the two possible linked request lists 700 which may be stored in its local memory 362a–n. These two block transfer done bits are determined by block transfer controller 368. After each transfer by block transfer controller 368 according to linked request lists 700 is finished, the corresponding block transfer done bit in the condition code register of the serviced datapath 360a–n is set by controller 368. The block transfer done bits are cleared by block transfer controller 368 when the following block transfer is initiated by execution units 360a–n. The block transfer done bits are microcode condition codes. The microcode can use a "branch if condition" instruction to generate an IO_WAIT() function when required for a block transfer between global memory 366 and local memories 362a–n within image processor 300.

Block transfer operations within single-instruction multiple-data image processor 300 have lower access priority than instruction fetches and scalar transfers as previously described. Block transfer controller 368 therefore suspends a lower priority block transfer operation requested by an execution unit 360a–n when a transfer operation of a higher priority is requested by a different execution unit 360a–n. Block transfer controller 368 and memory interface 370 first finish any outstanding read or write request for block transfers and save the parameters of the command template 704, 706, 708 specifying the block transfer in progress.

The parameters saved by block transfer controller 368 when a higher priority transfer is initiated include the next address in external global memory 366 and the next address in local memory 362a–n of the datapath 358a–n being serviced. These parameters are saved in registers (not shown) within block transfer controller 368. Block transfer controller 368 then services the higher priority access. When the higher priority access is complete, block transfer controller 368 retrieves the saved address parameters from its registers and resumes or reinstates the suspended block transfer.

As previously described, only the instruction fetch and the scalar transfer have higher priority than the block transfer within single-instruction multiple-data architecture 300 as controlled by block transfer controller 368. A block transfer in an interrupt routine does not have higher priority than an initiated block transfer. Thus initiated block transfer is serviced first by controller 368. Block transfer controller 368 thus provides interruptible memory transfers between local memories 362a–n and system memory 364 or global memory 366. If a block transfer is initiated within single instruction multiple-data image processor 300 while a cache miss, scalar transfer, or first-in first-out access is being serviced by controller 368, it must wait until the higher priority request is finished.

Figure 9:
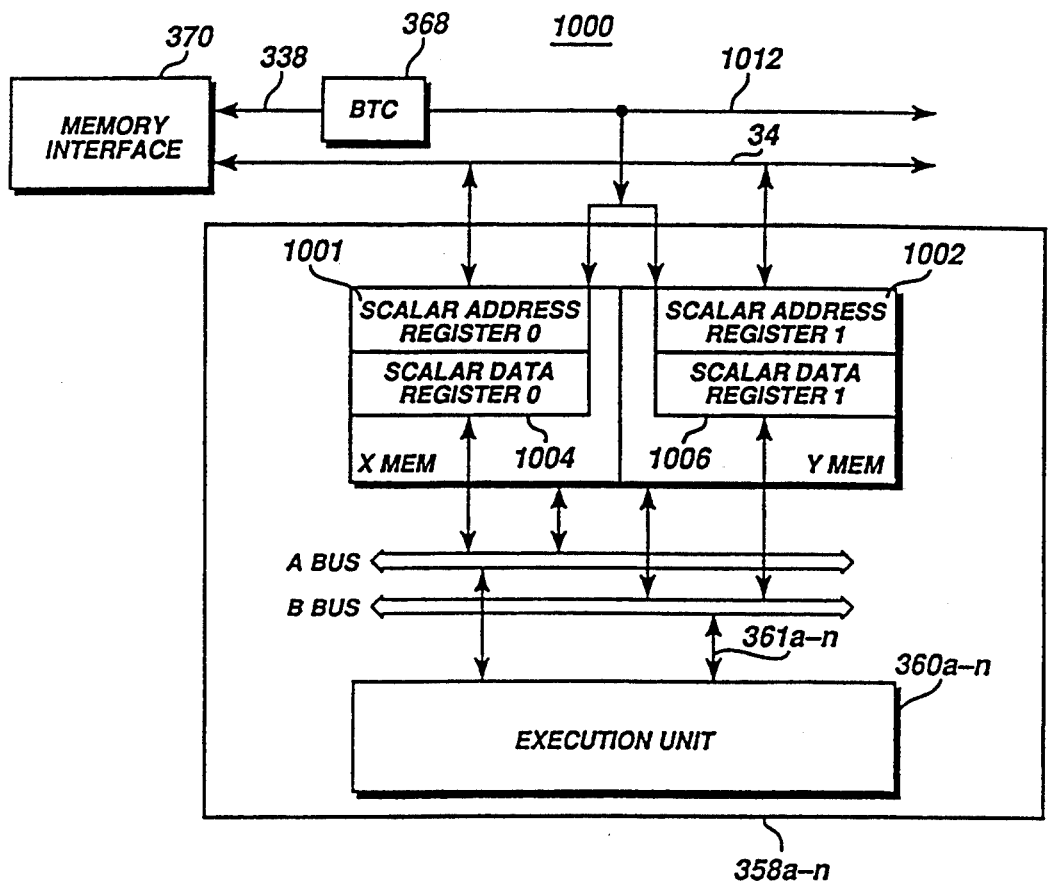
FIG. 9 shows a block diagram representation of a system for performing internal scalar transfers between the datapaths of the single-instruction multiple-data image processor of FIG. 3.

Referring now to FIG. 9, there is shown scalar access transfer system 1000 of single-instruction multiple-data image processor 300. Within scalar access system 1000, there are two sets of scalar transfer controls for block transfer control 368. Within each execution unit 360a–n of image processor 300, there are two scalar address registers 1001, 1002 and two scalar data registers 1004, 1006. Scalar data registers 1004, 1006 may be thirty two bits wide. Scalar address register 1001 and scalar data register 1004 within execution unit 360a–n are associated with the first set of transfer controls. Scalar address register 1002 and scalar data register 1006 are associated with the second set. Address registers 1001, 1002 hold the address in external memory 364, 366. Address registers 1001, 1002 may be loaded by either of two buses, the A-Bus or the B-Bus. Each scalar data register 1004, 1006 can be read or written by either the A-Bus or the B-Bus.

For an output scalar transfer, block transfer controller 368 fetches the contents of scalar address register 1001 or scalar address register 1002 as well as data register 1004 or data register 1006. This fetch is performed by way of transfer data bus 340. For an input scalar transfer, block transfer controller 368 fetches scalar address register 1001, 1002, loads to interface 370, and fetches the return data load to data register 1004, 1006 through transfer data bus 340. The scalar access may support byte, half word, and word alignment. Byte and half word data fetched and loaded in scalar data registers 1004, 1006 are right justified.

For a scalar write, scalar data register 1004 or scalar date register 1006 must be written first. The scalar output address register may then be written. Writing to the scalar output register initiates a scalar output transfer request to block transfer controller 368. For the scalar input transfer, the user of image processor 300 writes scalar input address register 1001 or scalar input address register 1002. The scalar done bit is cleared when the scalar transfer is posted. After the scalar transfer is initiated, block transfer controller 368 samples all active execution units 360a–n and processes the scalar transfers starting with execution unit 360a. An execution unit 360a–n is determined to be active when its execution mask flag is reset. The scalar done bit of an active execution unit 360a–n must be checked by block transfer controller 368 before initiating the next scalar transfer. Writing to scalar address register 1001, 1002 or scalar data register 1004, 1006 when the scalar done bit is not set causes indeterminate results.

Block transfer controller 368 processes scalar transfers from active execution units 360a–n within image processor 300, beginning with execution unit 360a. For outputs, block transfer controller 368 fetches the scalar address and scalar data from the first active execution unit 360a–n and executes a write to global memory 366 through memory interface 370. For inputs, block transfer controller 368 only fetches the scalar address, executes a read of global memory 366 and loads the data which it read from global memory 366 into the scalar data register.

After processing execution unit 360a, if execution unit 360a is active, block transfer controller 368 proceeds to the remaining active execution units 360b–n until all active execution units 360a–n are serviced. After the first set of scalar transfers is completed, the first scalar done bit is set by block transfer controller 368. When finished with the first set of scalar transfers, block transfer controller 368 processes the second set in the same sequence. When the second set of scalar transfers is completed, block transfer controller 368 sets the second scalar done bit. Each execution datapath 358a–n of single-instruction multiple-data image processor 300 may have up to two sets of scalar transfers pending at same time within execution datapaths 358a–n. Image processor 300 cannot initiate a third scalar transfer before the first transfer is completed.

The two scalar done bits are located in the condition code register of each execution datapath 358a–n. These two scalar done bits are determined by block transfer controller 368, one for each set of scalar transfers, as previously described. The scalar done bits are cleared when execution units 360a–n again initiate scalar transfers in accordance with instructions applied to execution units 360a–n by sequence controller 352 by way of instruction broadcast line 356. To generate the correct results for scalar transfers, it is therefore necessary to check the scalar done bits before initiating the scalar transfer.

As previously described, the scalar transfer has lower access priority than the, instruction fetch within single-instruction multiple-data image processor 300 of the present invention. Block transfer controller 368 of image processor 300 therefore suspends any scalar transfer operation in progress when an instruction fetch is requested. To service the instruction fetch, block transfer controller 368 and memory interface 370 finish the outstanding read or write access of the scalar transfer being suspended. The higher priority instruction fetch is serviced by block transfer controller 368. The suspended scalar transfer is then completed.

Block transfer controller 368 supports scalar internal broadcast transfer. When the microcode writes to the internal broadcast transfer registers the broadcast scalar transfer is initiated. The data in the scalar data register is broadcasted to other scalar data registers. The execution mask bit of all but one of the n individual execution units 360a–n is set in order to initiate a scalar internal broadcast transfer within single-instruction multiple-data image processor 300. The data register of the single unmasked execution unit 360a–n is the source of the request for the scalar internal broadcast transfer. The data registers of the remaining masked execution units 360a–n are destinations for the scalar internal broadcast transfer. The scalar broadcast only supports word data transfer. The scalar address registers are ignored in the scalar broadcast transfer.

Block transfer controller 368 also supports instruction fetch for single-instruction multiple-data image processor 300. When the instruction cache of single-instruction multiple-data image processor 300 misses within image processor 300, sequence controller 352 is halted. Following this, block transfer controller 368 fetches the external instruction block address from sequence controller 352. Block transfer controller 368 uses the block address to read an instruction block from memory and load it into instruction random access memory 380 located in controller 352. After the instructions are loaded, sequence controller 352 resumes operation and applies instructions to execution datapaths 358a–n.

Figure 10:
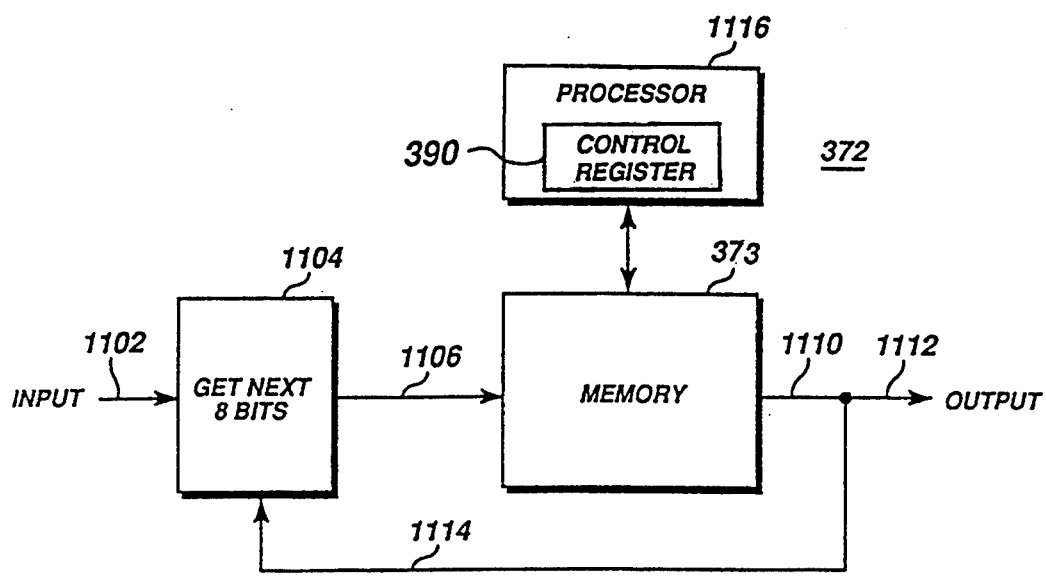
FIG. 10 shows a block diagram representation of a statistical decoder for decoding variable length codes within the single-instruction multiple-data image processor of FIG. 3.

Referring now to FIG. 10, there is shown a more detailed block diagram representation of statistical decoder input channel 372 of single-instruction multiple-data image processor 300 of the present invention. Statistical decoder input channel 372 of image processor 300 is a specialized input channel having input channel processor 1116 that reads a variable-length bit sequence from global memory 366 and converts it into a fixed-length bit sequence that is read by execution datapath 358a only.

Because input channel 372 or statistical decoder 372 is a specialized hardware channel having its own input channel processor 1116 it may function as a semi-autonomous unit capable of performing part of the decoding process. This removes some of the burden of decoding input data from execution units 360a–n and eliminates the need for some instruction coding. Input channel processor 1116, execution units 360a–n, and transmission output line 1112 are all formed on a single integrated circuit chip.

Statistical decoder channel 372 functions by having input channel processor 1116 prefetch and decode data. This function is performed when the program executing on executing units 360a–n provides the address of the data to channel processor 1116 and instructs it to begin. It will be understood that the decoding performed by input channel processor 1116 of statistical decoder input channel 372 may take place simultaneously with execution of program instructions by execution units 360a–n. The program executing on execution units 360a–n of image processor 300 later reads and processes the data received from statistical decoder 372 by way of transmission line 1112.

During image compression by an image processor such as single-instruction multiple-data image processor 300, as well as during other applications such as text compression, certain values within the data being compressed occur more frequently than others. One way to compress data of this nature is to use fewer bits to encode more frequently occurring values and more bits to encode less frequently occurring values. This type of encoding results in a variable-length sequence in which the length of a code may range, for example, from one bit to sixteen bits. It will be understood by those skilled in the art that a code is a group of bits used to encode a single value.

Statistical decoder input channel input channel 372 includes get_next_8-bits logic block 1104 and memory 373. Memory 373 may store a decoding tree such as a conventional Huffman coding tree. Decoder 372 may, for example, decode up to eight bits in code length. Input channel processor 1116 of statistical decoder 372 determines the next eight parallel bits of a bitstream applied to decoder 372 by way of input line 1102 and uses them as an address on address line 1106 to access memory 373. Using the address information in this way, statistical decoder 372 obtains a decoded value from memory 373. This decoded memory output value, which may have a twenty bit format, appears on memory output line 1110.

In the preferred embodiment, four bits of the format stored in memory 373 may be used to indicate the size of the bits to be shifted in the next cycle, one bit may provide a flag for indicating when the decoding is completed, and fifteen bits may represent the value returned to the microcode executing within execution datapaths 358a–n. Feedback loop 1114 feeds the four bits of shift size back to get_next_8-bit logic block 1104. In the preferred embodiment the sixteen bit output value appears on decoder output line 1112.

Statistical decoder input channel 372 of single-instruction multiple-data processor 300 may operate in one of two modes, a native mode and a compatible mode. In the native mode, statistical decoder 372 may be used for Huffman decoding. In this mode of statistical decoder 372, decoder 372 decodes data provided by a conventional Huffman coding scheme in a manner well known to those skilled in the art. The Huffman coding scheme is described in Huffman, D. A., "A Method for the Construction of Minimum Redundancy Codes," Proc. Inst Electr. Radio Eng 40, 9, Sep., 1952, pages 1098–1101.

When in the compatible mode, statistical decoder 372 of image processor 300 may be used for the statistical decoding of data encoded by coding schemes other than a conventional Huffman encoding scheme in accordance with the operation of compatible image processors (not shown). Operation of statistical decoder 372 in the native mode or in the conditional mode may be selected by writing an appropriate value into a control register (not shown) within sequence controller 352. It is possible to use statistical decoder 372 in either of these two modes, whether image processor 300 is running in its own native mode or in a compatible mode provided for processing of data in accordance with a compatible image processor (not shown).

Figure 11:
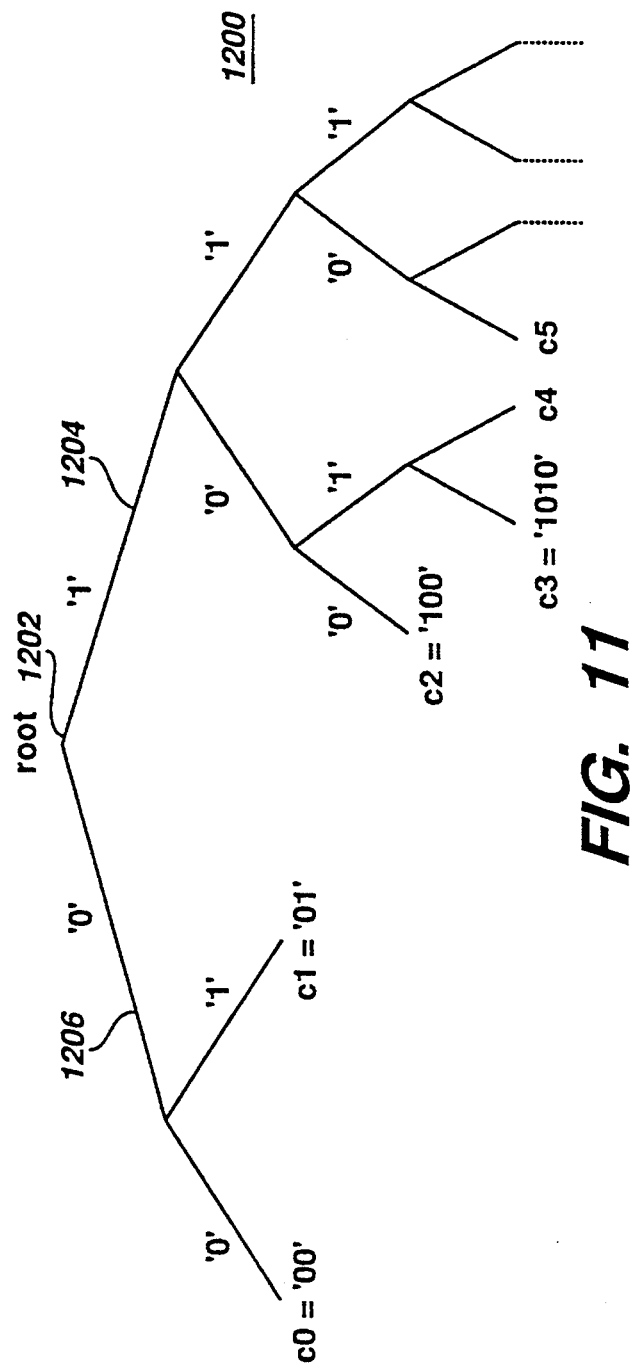
FIG. 11 shows a binary decoding tree for decoding variable length codes within the statistical decoder of FIG. 10.

Referring now to FIG. 11, there is shown binary decoding tree 1200. Binary decoding tree 1200 represents a coding scheme such as a conventional Huffman coding scheme. Binary decoding tree 1200 is used by statistical decoder 372 to convert variable-length bit input sequences into fixed length bit sequences within single-instruction multiple-data image processor 300. Memory 1108 of statistical decoder 372 may store binary decoding tree 1200 for decoding variable length coded data within single-instruction multiple-data image processor 300 of the present invention. Access to values determined in accordance with binary decoding tree 1200 and stored within memory 373 is obtained by way of address line 1106 as previously described.

Decoding by means of binary decoding tree 1200 begins at root node 1202. When decoding is performed bit-by-bit, statistical decoder 372 tests the next bit from the bitstream of decoder input line 1102 to determine whether the next bit has the value one or the value zero. Statistical decoder 372 takes right branch 1204 of binary decoding tree 1200 if the tested bit is one. Statistical decoder 372 takes left branch 1206, if the tested bit is zero.

There is a decode_completed flag associated with each node of binary decoding tree 1200. The decode_completed flag indicates whether the decoding of a bit sequence is completed at the node. If the decode_completed flag for a node is set, statistical decoder 372 stops decoding, and reports the value stored in the node. Then, the next decoding starts from root node 1202. If the flag is not set, statistical decoder 372 tests the next bit of the input bitstream and continues from its current node.

In this example, decoding is performed by statistical decoder 372 bit-by-bit while using binary decoding tree 1200. However, statistical decoder 372 of image processor 300 may also decode several bits of the input bitstream at a time.

The contents of Table 1, code table T$_1$, are an example of a code table which may be stored in memory space 373. Data which may correspond to table T$_1$ is set forth in Table 2.

It will be understood that various changes in the details, materials and arrangements of the parts which have been described and illustrated in order to explain the nature of this invention may be made by those skilled in the art without departing from the principle and scope of the invention as expressed in the following claims.

I claim:

1. A dual data decoder for decoding encoded input data, comprising:

first and second data reading means for reading variable length encoded data and fixed length encoded data, respectively; and indicating means for indicating first and second data reading modes corresponding to the first and second data reading means, respectively.

2. The dual data decoder of claim 1, further comprising mode determining means coupled to the indicating means for providing a select signal in response to the indicating.

3. The dual data decoder of claim 2, wherein the mode determining means includes means for selecting one of the first and second data reading means in response to the select signal.

4. The dual data decoder of claim 1, further comprising means for decoding variable length encoded data and fixed length encoded data.

5. The dual data decoder of claim 1, further comprising means for intermittently reading fixed length encoded data while operating in the first data reading mode.

6. The dual data decoder of claim 1, further comprising means for alternatively operating in the first and second data reading modes.

7. The dual data decoder of claim 1, further comprising:
storage space means for storing decoder tables for decoding the encoded input data, the storage space means having a first configuration for storing a single decoder table of a first size;
memory control means for reconfiguring the storage space means to provide a second configuration for storing a plurality of decoder tables of a second size; and
means for decoding the encoded input data selectively (1) in accordance with the single decoder table and (2) in accordance with a selected one of the plurality of decoder tables.

8. The dual data decoder of claim 3, further comprising:
means for decoding variable length encoded data and fixed length encoded data;
means for intermittently reading fixed length encoded data while operating in the first data reading mode;
means for alternatively operating in the first and second data reading modes;
storage space means for storing decoder tables for decoding the encoded input data, the storage space means having a first configuration for storing a single decoder table of a first size;
memory control means for reconfiguring the storage space means to provide a second configuration for storing a plurality of decoder tables of a second size; and
means for decoding the encoded input data selectively (1) in accordance with the single decoder table and (2) in accordance with a selected one of the plurality of decoder tables.

9. The dual data decoder of claim 8, wherein the decoder tables are optimized for the encoding of an individual image.

10. The dual data decoder of claim 8, wherein the decoder tables are fixed decoder tables optimized for encoding a plurality of images.

11. The dual data decoder of claim 8, wherein: the dual data decoder is electrically connected to a bus; and the bus is electrically connected to a memory device.

12. The dual data decoder of claim 1, wherein: the dual data decoder is electrically connected to a bus; and the bus is electrically connected to a memory device.

13. A dual data decoder for decoding encoded input data, comprising:
variable length and fixed length readers for reading variable length encoded data and fixed length encoded data, respectively; and
a memory control register having a variable length mode field for indicating first and second data reading modes corresponding to the variable length and fixed length readers, respectively.

14. The dual data decoder of claim 13, further comprising a variable length mode detector coupled to the variable length mode field of the memory control register for providing a select signal in response to the variable length mode field.

15. The dual data decoder of claim 14, wherein the variable length mode detector includes means for selecting one of the variable length and fixed length readers in response to the select signal.

16. The dual data decoder of claim 13, further comprising a decoder processor for decoding variable length encoded data and fixed length encoded data.

17. The dual data decoder of claim 13, wherein the dual data decoder is configured for intermittently reading fixed length encoded data while operating in the first data reading mode.

18. The dual data decoder of claim 13, wherein the dual data decoder is configured for alternatively operating in the first and second data reading modes.

19. The dual data decoder of claim 13, further comprising:
a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and
a decoder processor for decoding the encoded input data selectively (1) in accordance with the single decoder table and (2) in accordance with a selected one of the plurality of decoder tables.

20. The dual data decoder of claim 15, further comprising:
a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size;
a decoder processor for decoding variable length encoded data and fixed length encoded data, and for decoding the encoded input data selectively (1) in accordance with the single decoder table and (2) in accordance with a selected one of the plurality of decoder tables; and
further wherein the dual data decoder is configured for alternatively operating in the first and second data reading modes.

21. The dual data decoder of claim 20, wherein the decoder tables are optimized for the encoding of an individual image.

22. The dual data decoder of claim 20, wherein the decoder tables are fixed decoder tables optimized for encoding a plurality of images.

23. The dual data decoder of claim 20, wherein: the dual data decoder is electrically connected to a bus; and the bus is electrically connected to a memory device.

24. The dual data decoder of claim 13, wherein: the dual data decoder is electrically connected to a bus; and the bus is electrically connected to a memory device.

25. A method for decoding encoded input data, comprising the steps of:
(a) providing the encoded input data, wherein the encoded input data comprises either variable length encoded data or fixed length encoded data;
(b) reading the encoded input data; and
(c) indicating first and second data reading modes corresponding to the variable length and fixed length encoded data, respectively.

26. The method of claim 25, further comprising the step of providing a select signal in response to the indicated first or second data reading mode.

27. The method of claim 26, further comprising the step of reading the encoded input data in either the first or second data reading mode in response to the select signal.

28. The method of claim 25, further comprising the step of decoding the encoded input data using a processor.

29. The method of claim 25, further comprising the step of intermittently reading fixed length encoded data while operating in the first data reading mode.

30. The method of claim 25, further comprising the step of alternatively operating in the first and second data reading modes.

31. The method of claim 25, further comprising the steps of:
   (d) storing, using a decoder memory, decoder tables for decoding the encoded input data;
   (e) configuring selectively the decoder memory for storing (1) a single decoder table of a first size, or (2) a plurality of decoder tables of a second size; and
   (f) decoding the encoded input data selectively (1) in accordance with the single decoder table and (2) in accordance with a selected one of the plurality of decoder tables.

32. The method of claim 27, further comprising the steps of:
   storing, using a decoder memory, decoder tables for decoding the encoded input data;
   configuring selectively the decoder memory for storing (1) a single decoder table of a first size, or (2) a plurality of decoder tables of a second size;
   decoding, using a processor, the encoded input data selectively (1) in accordance with the single decoder table and (2) in accordance with a selected one of the plurality of decoder tables; and
   alternatively operating in the first and second data reading modes.

33. The method of claim 32, wherein the decoder tables are optimized for the encoding of an individual image.

34. The method of claim 32, wherein the decoder tables are fixed decoder tables optimized for encoding a plurality of images.

35. A dual data decoder for decoding encoded input data, comprising:
   (a) first and second data reading means for reading variable length encoded data and fixed length encoded data, respectively; and
   (b) means for intermittently reading fixed length encoded data while operating in a first data reading mode, the first data reading mode corresponding to the first data reading means.

36. The dual data decoder of claim 35, further comprising:
   (c) indicating means for indicating the first data reading mode and for indicating a second data reading mode, the second data reading mode corresponding to the second data reading means; and
   (d) mode determining means coupled to the indicating means for providing a select signal in response to the indicating, wherein the mode determining means includes means for selecting one of the first and second data reading means in response to the select signal.

37. The dual data decoder of claim 35, further comprising means for decoding variable length encoded data and fixed length encoded data.

38. The dual data decoder of claim 35, further comprising means for alternatively operating in the first and second data reading modes.

39. The dual data decoder of claim 35, further comprising:
   (c) storage space means for storing decoder tables for decoding the encoded input data, the storage space means having a first configuration for storing a single decoder table of a first size;
   (d) memory control means for reconfiguring the storage space means to provide a second configuration for storing a plurality of decoder tables of a second size; and
   (e) means for decoding the encoded input data selectively (1) in accordance with the single decoder table and (2) in accordance with a selected one of the plurality of decoder tables.

40. The dual data decoder of claim 35, wherein: the dual data decoder is electrically connected to a bus; and the bus is electrically connected to a memory device.

41. A dual data decoder for decoding encoded input data, comprising:
   (a) a variable length reader for reading variable length encoded data; and
   (b) fixed length reader for reading fixed length encoded data, wherein the dual data decoder is configured for intermittently reading fixed length encoded data while operating in a first data reading mode, the first data reading mode corresponding to the variable length reader.

42. The dual data decoder of claim 41, further comprising:
   (c) a memory control register having a variable length mode field for indicating the first data reading mode and for indicating a second data reading mode, the second data reading mode corresponding to the fixed length reader; and
   (d) a variable length mode detector coupled to the variable length mode field of the memory control register for providing a select signal in response to the variable length mode field, wherein the variable length mode detector includes means for selecting one of the variable length and fixed length readers in response to the select signal.

43. The dual data decoder of claim 41, further comprising a decoder processor for decoding variable length encoded data and fixed length encoded data.

44. The dual data decoder of claim 41, wherein the dual data decoder is configured for alternatively operating in the first and second data reading modes.

45. The dual data decoder of claim 41, further comprising:
   (c) a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and
   (d) a decoder processor for decoding the encoded input data selectively (1) in accordance with the single decoder table and (2) in accordance with a selected one of the plurality of decoder tables.

46. The dual data decoder of claim 41, wherein: the dual data decoder is electrically connected to a bus; and the bus is electrically connected to a memory device.

47. A method for decoding encoded input data, comprising the steps of:
   (a) providing the encoded input data, wherein the encoded input data comprises either variable length encoded data or fixed length encoded data; and
   (b) intermittently reading fixed length encoded data while operating in a first data reading mode corresponding to the variable length encoded data.

48. The method of claim 47, further comprising the steps of:
   (c) indicating a variable or fixed status corresponding to the variable length and fixed length encoded data, respectively; and
   (d) providing a select signal in response to the indicated variable or fixed status, wherein step (b) comprises the step of intermittently reading fixed length encoded data in response to the select signal while operating in a first data reading mode.

49. The method of claim 47, comprising the further step of decoding the encoded input data using a processor.

50. The method of claim 47, further comprising the steps of:
   (c) storing, using a decoder memory, decoder tables for decoding the encoded input data;
   (d) configuring selectively the decoder memory for storing (1) a single decoder table of a first size, or (2) a plurality of decoder tables of a second size; and
   (e) decoding the encoded input data selectively (1) in accordance with the single decoder table and (2) in accordance with a selected one of the plurality of decoder tables.

51. A dual data decoder for decoding encoded input data, comprising:
   (a) first and second data reading means for reading variable length encoded data and fixed length encoded data, respectively; and
   (b) means for alternatively operating in first and second data reading modes corresponding to the first and second data reading means, respectively.

52. The dual data decoder of claim 51, further comprising:
   (c) indicating means for indicating the first and second data reading modes;
   (d) mode determining means coupled to the indicating means for providing a select signal in response to the indicating, wherein the mode determining means includes means for selecting one of the first and second data reading means in response to the select signal.

53. The dual data decoder of claim 51, further comprising means for decoding variable length encoded data and fixed length encoded data.

54. The dual data decoder of claim 51, further comprising:
   (c) storage space means for storing decoder tables for decoding the encoded input data, the storage space means having a first configuration for storing a single decoder table of a first size;
   (d) memory control means for reconfiguring the storage space means to provide a second configuration for storing a plurality of decoder tables of a second size; and
   (e) means for decoding the encoded input data selectively (1) in accordance with the single decoder table and (2) in accordance with a selected one of the plurality of decoder tables.

55. The dual data decoder of claim 51, wherein: the dual data decoder is electrically connected to a bus; and the bus is electrically connected to a memory device.

56. A dual data decoder for decoding encoded input data, comprising:
   (a) a variable length reader for reading variable length encoded data; and
   (b) a fixed length reader for reading fixed length encoded data, wherein the dual data decoder is configured for alternatively operating in first and second data reading modes, the first and second data reading modes corresponding to the variable length and fixed length readers, respectively.

57. The dual data decoder of claim 56, further comprising:
   (c) a memory control register having a variable length mode field for indicating the first and second data reading modes; and
   (d) a variable length mode detector coupled to the variable length mode field of the memory control register for providing a select signal in response to the variable length mode field, wherein the variable length mode detector includes means for selecting one of the variable length and fixed length readers in response to the select signal.

58. The dual data decoder of claim 56, further comprising a decoder processor for decoding variable length encoded data and fixed length encoded data.

59. The dual data decoder of claim 56, further comprising:
   (c) a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and
   (d) a decoder processor for decoding the encoded input data selectively (1) in accordance with the single decoder table and (2) in accordance with a selected one of the plurality of decoder tables.

60. The dual data decoder of claim 56, wherein: the dual data decoder is electrically connected to a bus; and the bus is electrically connected to a memory device.

61. A method for decoding encoded input data, comprising the steps of:
   (a) providing the encoded input data, wherein the encoded input data comprises either variable length encoded data or fixed length encoded data;
   (b) reading the encoded input data;
   (c) alternatively operating in first and second data reading modes corresponding to the variable length and fixed length encoded data, respectively.

62. The method of claim 61, further comprising the steps of:
   (d) indicating the first and second data reading modes;
   (e) providing a select signal in response to the indicated first or second data reading mode; and
   (f) reading the encoded input data in either the first or second data reading mode in response to the select signal.

63. The method of claim 61, further comprising the step of decoding the encoded input data using a processor.

64. The method of claim 61, further comprising the steps of:
   (d) storing, using a decoder memory, decoder tables for decoding the encoded input data;
   (e) configuring selectively the decoder memory for storing (1) a single decoder table of a first size, or (2) a plurality of decoder tables of a second size; and
   (f) decoding the encoded input data selectively (1) in accordance with the single decoder table and (2) in accordance with a selected one of the plurality of decoder tables.

65. A dual data decoder for decoding encoded input data, comprising:
   (a) first and second data reading means for reading variable length encoded data and fixed length encoded data, respectively;
   (b) storage space means for storing decoder tables for decoding the encoded input data, the storage space means having a first configuration for storing a single decoder table of a first size;
   (c) memory control means for reconfiguring the storage space means to provide a second configuration for storing a plurality of decoder tables of a second size; and
   (d) means for decoding the encoded input data selectively (1) in accordance with the single decoder table and (2) in accordance with a selected one of the plurality of decoder tables.

66. The dual data decoder of claim 65, further comprising:
   (e) indicating means for indicating first and second data reading modes corresponding to the first and second data reading means, respectively; and
   (f) mode determining means coupled to the indicating means for providing a select signal in response to the indicating, wherein the mode determining means includes means for selecting one of the first and second data reading means in response to the select signal.

67. The dual data decoder of claim 65, further comprising means for decoding variable length encoded data and fixed length encoded data.

68. The dual data decoder of claim 65, wherein the decoder tables are optimized for the encoding of an individual image.

69. The dual data decoder of claim 65, wherein the decoder tables are fixed decoder tables optimized for encoding a plurality of images.

70. The dual data decoder of claim 65, wherein:
   the dual data decoder is electrically connected to a bus; and
   the bus is electrically connected to a memory device.

71. A dual data decoder for decoding encoded input data, comprising:
   (a) variable length and fixed length readers for reading variable length encoded data and fixed length encoded data, respectively;
   (b) a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and
   (c) a decoder processor for decoding the encoded input data selectively (1) in accordance with the single decoder table and (2) in accordance with a selected one of the plurality of decoder tables.

72. The dual data decoder of claim 71, further comprising:
   (c) a memory control register having a variable length mode field for indicating first and second data reading modes, the first and second data reading modes corresponding to the variable length and fixed length readers, respectively; and
   (d) a variable length mode detector coupled to the variable length mode field of the memory control register for providing a select signal in response to the variable length mode field, wherein the variable length mode detector includes means for selecting one of the variable length and fixed length readers in response to the select signal.

73. The dual data decoder of claim 71, further comprising a decoder processor for decoding variable length encoded data and fixed length encoded data.

74. The dual data decoder of claim 71, wherein the decoder tables are optimized for the encoding of an individual image.

75. The dual data decoder of claim 71, wherein the decoder tables are fixed decoder tables optimized for encoding a plurality of images.

76. The dual data decoder of claim 71, wherein:
   the dual data decoder is electrically connected to a bus; and
   the bus is electrically connected to a memory device.

77. A method for decoding encoded input data, comprising the steps of:
   (a) providing the encoded input data, wherein the encoded input data comprises either variable length encoded data or fixed length encoded data;
   (b) reading the encoded input data;
   (c) storing, using a decoder memory, decoder tables for decoding the encoded input data;
   (d) configuring selectively the decoder memory for storing (1) a single decoder table of a first size, or (2) a plurality of decoder tables of a second size; and
   (e) decoding the encoded input data selectively (1) in accordance with the single decoder table and (2) in accordance with a selected one of the plurality of decoder tables.

78. The method of claim 77, further comprising the steps of:
   (f) indicating first and second data reading modes corresponding to the variable length and fixed length encoded data, respectively;
   (g) providing a select signal in response to the indicated first or second data reading mode; and
   (h) reading the encoded input data in either the first or second data reading mode in response to the select signal.

79. The method of claim 77, wherein the encoded input data is decoded using a processor.

80. The method of claim 77, wherein the decoder tables are optimized for the encoding of an individual image.

81. The method of claim 77, wherein the decoder tables are fixed decoder tables optimized for encoding a plurality of images.

* * * * *

UNITED STATES PATENT AND TRADEMARK OFFICE
CERTIFICATE OF CORRECTION

PATENT NO.    :   5,452,101
DATED         :   September 19, 1995
INVENTOR(S)   :   Michael Keith It is certified that error appears in the above-identified patent and that said Letters Patent is hereby corrected as shown below:

Column 18, line 37, delete "$DCT_{block(temp-block1)}$;" and insert therefor
--DCT_block(temp_block1);--

Column 18, line 41, delete "$DCT_{block(temp}$block2);" and insert therefor
--DCT_block(temp_block2);--

Column 19, line 58; delete "DCT_block(temp$_{block}$);" and insert therefor
--DCT_block(temp_block);--

Signed and Sealed this

Thirteenth Day of August, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO : 5,452,101

DATED : September 19, 1995

INVENTOR(S) : Michael Keith

It is certified that error appears in the above-identified patent and that said Letters Patent is hereby corrected as shown below:

Please insert the following text at Column 28, between lines 37 and 38:

| Value | Code | Size |
|---|---|---|
| 0 | 00 | 2 |
| 1 | 01 | 2 |
| 2 | 100 | 3 |
| 3 | 1010 | 4 |
| 4 | 1011 | 4 |
| 5 | 1100 | 4 |
| 6 | 11010 | 5 |
| 7 | 11011 | 5 |
| 8 | 11100 | 5 |
| 9 | 111010 | 6 |
| 10 | 111011 | 6 |
| 11 | 1111000 | 7 |
| 12 | 1111001 | 7 |
| : | : | : |
| : | : | : |
| 254 | 11111111 11111101 | 16 |
| 255 | 11111111 11111110 | 16 |

Table 1

UNITED STATES PATENT AND TRADEMARK OFFICE
CERTIFICATE OF CORRECTION

PATENT NO : 5,452,101

DATED : September 19, 1995

INVENTOR(S) : Michael Keith

It is certified that error appears in the above-identified patent and that said Letters Patent is hereby corrected as shown below:

| Address | Flag | Value | Size |
|---|---|---|---|
| 0-63 | 0 | 0 | 2 |
| 64-127 | 0 | 1 | 2 |
| 128-159 | 0 | 2 | 3 |
| 160-175 | 0 | 3 | 4 |
| 176-191 | 0 | 4 | 4 |
| 192-207 | 0 | 5 | 4 |
| 208-215 | 0 | 6 | 5 |
| 216-223 | 0 | 7 | 5 |
| 246-247 | 0 | 14 | 7 |
| 248 | 0 | 15 | 8 |
| 249 | 0 | 16 | 8 |
| 250 | 0 | 17 | 8 |
| 251 | 1 | 251 | 8 |
| 252 | 1 | 252 | 8 |
| 253 | 1 | 253 | 8 |
| 254 | 1 | 254 | 8 |
| 255 | 1 | 255 | 8 |

Table 2

UNITED STATES PATENT AND TRADEMARK OFFICE
CERTIFICATE OF CORRECTION

Figure 12:
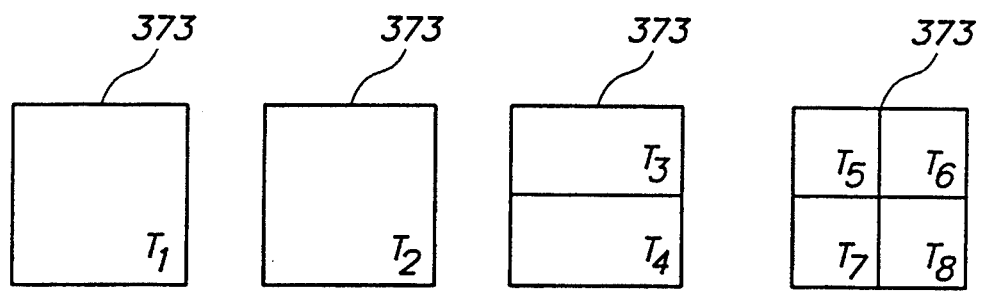
FIG. 12 shows divisions of memory space within the statistical decoder for storing Huffman tables.

PATENT NO : 5,452,101 Page 3 of 14
DATED : September 19, 1995
INVENTOR(S) : Michael Keith It is certified that error appears in the above-identified patent and that said Letters Patent is hereby corrected as shown below:

Referring now to Fig. 12, there is shown a single table such as table $T_1$ occupying predetermined memory space 373 within statistical encoder 372. A plurality of tables such as $T_1$ may be provided and each such table may be adapted to decode an image in a conventional manner. Thus, Table $T_1$ may occupy memory space 373 within statistical decoder 372 for the purpose of decoding an image. When a further image is decoded a different table $T_2$ may be swapped into memory space 373. The second Huffman table $T_2$, rather than Table $T_1$, may therefore be stored in memory space 373 within statistical encoder 372 while decoding this further image. It will be understood by those skilled in the art that tables such as tables $T_1$ and $T_2$ may be swapped into and out of memory space 373 within statistical decoder 372 as needed depending on the images decoded.

In a further alternate embodiment of statistical decoder 372, one bit of precision may be sacrificed in table $T_1$ to provide a lower precision Huffman table $T_3$. Lower precision table $T_3$ may therefore be used to decode the images previously decoded by table $T_1$. Likewise, a single bit of precision may be sacrificed in table $T_2$ in order to provide lower precision Huffman table $T_4$. Lower precision table $T_4$ may be used to decode the images previously decoded by table $T_2$. In this case the memory space required to store either table $T_3$ or table $T_4$ is one-half the memory space required to store higher precision tables $T_1$ and $T_2$

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

Under these circumstances, both table $T_3$ and table $T_4$ may simultaneously occupy the same amount of memory space within statistical decoder 372 previously required to store either table $T_1$ or table $T_2$ alone. Therefore, it becomes possible to decode the image previously encoded by table $T_1$ and the image previously decoded by table $T_2$ without swapping any tables into or out of memory space 373 of decoder 372.

It will be understood by those skilled in the art that the savings in overhead achieved by not swapping tables into and out of memory space 373 of statistical decoder 372 is obtained at the cost of some precision in the decoding process. It is believed that a loss of one bit of precision in the decoding tables does not degrade image quality to an extent which is noticeable to an observer of the displayed image which is decoded according to the method of the present invention.

Furthermore, it will be understood that two bits of precision may be sacrificed in tables such as tables $T_1$ and $T_2$ to produce lower precision tables having a size one-quarter of the size of tables $T_1$ and $T_2$. Four fixed tables $T_5$, $T_6$, $T_7$ and $T_8$ of this size may be stored within statistical

UNITED STATES PATENT AND TRADEMARK OFFICE
CERTIFICATE OF CORRECTION

PATENT NO : 5,452,101

DATED : September 19, 1995

INVENTOR(S) : Michael Keith

It is certified that error appears in the above-identified patent and that said Letters Patent is hereby corrected as shown below:

encoder 372 in the same amount of memory space 373 as that previously occupied by either table $T_1$ or table $T_2$. This, of course, results in further degradation of image quality. Any number of tables may be made simultaneously available within memory space 373 of statistical decoder 372 in this manner for decoding images without any overhead for swapping tables. The only limit on the total number of tables which may reside in memory 373 is the amount of image degradation which is acceptable in an application.

Figure 13:
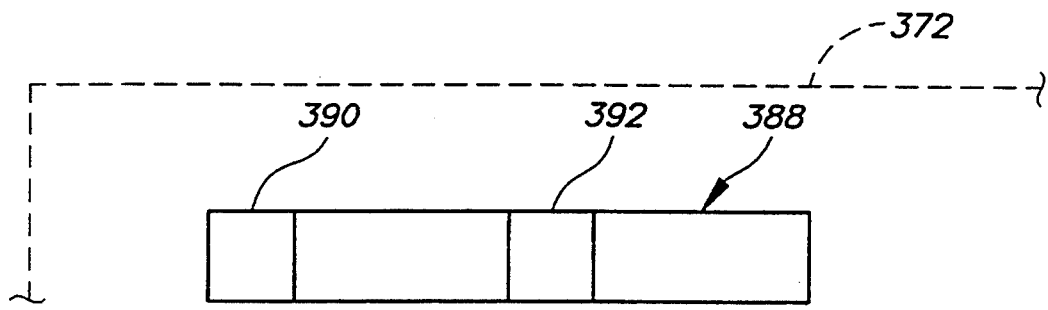
FIG. 13 shows a control register for controlling the divisions of memory space of FIG. 13.

Referring now to Fig. 13, there is shown statistical memory encoder control register 388. Statistical encoder memory control register 388 is disposed within statistical encoder 372 and is effective to configure memory space 373 within statistical encoder 372 for the decoder tables. Memory split field 390 of control register 388 may be used to specify to statistical encoder 372 the configuration of statistical decoder memory 373. Memory split field 390 may, for example, include two bits. In the preferred embodiment of control register 388, a binary value OX within memory split field 390 may indicate normal operation of memory 373. Normal operation may, in the preferred embodiment, configure memory space 373 as a single two hundred and fifty-six by twenty-one bit random access memory for storing tables such as table $T_1$ or Table $T_2$.

UNITED STATES PATENT AND TRADEMARK OFFICE
CERTIFICATE OF CORRECTION

PATENT NO : 5,452,101   Page 6 of 14

DATED : September 19, 1995

INVENTOR(S) : Michael Keith

It is certified that error appears in the above-identified patent and that said Letters Patent is hereby corrected as shown below:

A binary value 1 in the first bit position of memory split field 390 of statistical encoder memory control register 388 may indicate to statistical decoder 372 that a split memory operation is programmed. In the case where the first bit of memory split field 390 is 1, indicating a split, the second bit of split field 390 may indicate whether memory space 373 is split into two partitions or into four partitions.

For example, the binary value 10 is split field 390 of memory control register 388 may indicate two random access memory partitions each having a size of one hundred and twenty-eight by twenty-one bits. This split of memory 373 is suitable for storing tables such as table $T_3$ and table $T_4$. A binary value 1 in the second position of memory split field 390 may indicate a quad ram operation wherein there are four memory partitions of sixty-four by twenty-one bits within memory space 373. This quad memory split of memory space 373 is suitable for storing Huffman tables such as tables $T_5$, $T_6$, $T_7$ and $T_8$.

When a split ram operation or a quad memory operation is encoded within memory split field 390 of memory control register 388, partition select field 392 of control register 388 may be used to indicate which of the different partitions is active during a particular decoding operation. For example, where two partitions are provided, a zero in a predetermined bit position within partition select field 392 may indicate that addresses zero through one twenty seven of memory

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

space 373 are accessed during a decoding operation. A binary value of one may indicate that addresses one hundred twenty eight to two hundred fifty-six are accessed. When quad memory operations are performed within statistical encoder 372, two bits within partition select field 392 are required to indicate which of the four partitions is used.

Figure 14:
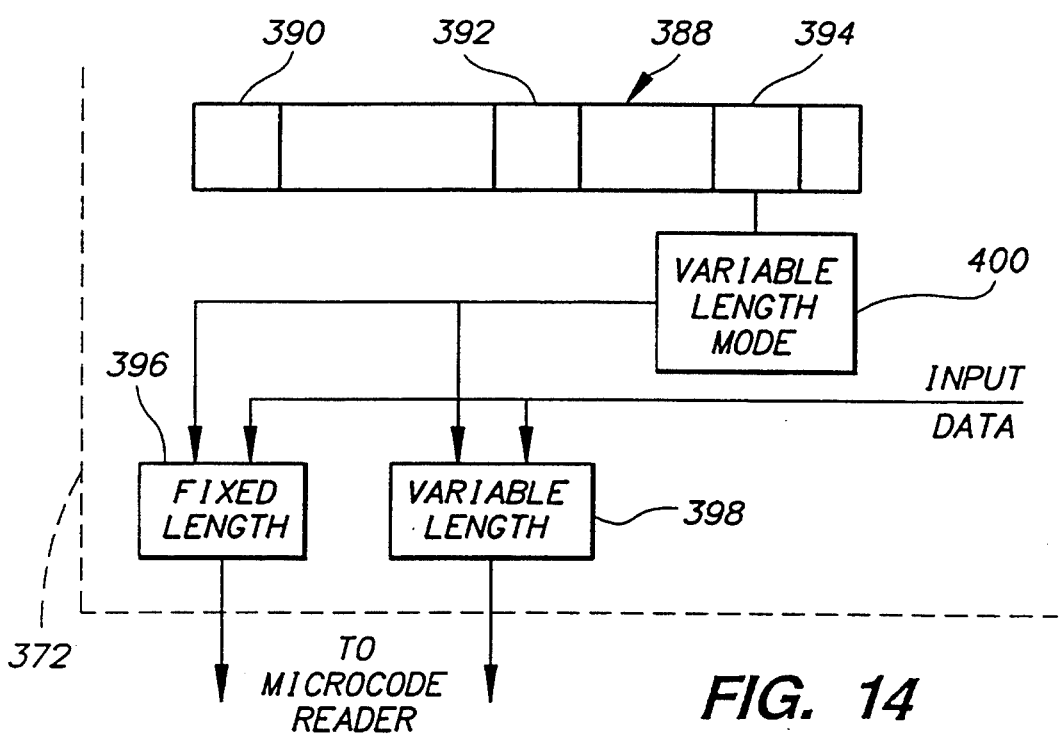
FIG. 14 shows an alternate embodiment of the statistical encoder of FIG. 13.

Referring now to Fig. 14, there is shown an alternate embodiment of statistical encoder control register 388 within statistical decoder 372. As previously described, statistical decoder 372 is a specialized input channel capable of reading variable-length code sequences from external memory and converting the variable-length code into a fixed-length bit sequence that may be read by a microcode sequencer.

Variable length encoding of the type decoded by statistical decoder 372 is based upon the fact that in image compression, as well as in other applications such as text compression, certain values occur more frequently than others. The statistical encoder uses fewer bits to encode more frequently occurring values and a larger number of bits to encode less frequently occurring values. This type of encoding results in a variable length sequence in which the length of the code, the group of bits used to encode a single value, can range, in a typical example, from one bit to sixteen bits.

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

Thus, when reading bit streams encoded in this manner, statistical decoder 372 must sometimes read a single bit, and at other times must read up to sixteen bits. The number of bits to be read each time is indicated to statistical decoder 372 by conventional run length encoding methods. In these run length methods a series of ones followed by a zero or a series of zeros followed by a one indicates to statistical decoder 372 the length of the current code and therefore the number of bits that statistical decoder 372 must read.

It is also known to use fixed length codes rather than variable length codes. However, when fixed length codes are used it is not possible to obtain the efficiency of using fewer bits to encode more frequently occurring data. Conversely, when a system obtains the efficiency of using fewer bits to represent more frequently occurring data by using variable length codes, it is not possible for the encoder to read a fixed length of data. However, in some applications it would be convenient to be able to read a fixed number of bits from the input data stream at certain points even though the remainder of the decoding process consists of reading variable length data.

Therefore, in the present invention statistical decoder 372 may be provided with variable length mode detector 400. Variable length mode detector 400 determines whether statistical

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

decoder 372 should operate in a variable length mode or in a fixed length mode in accordance with a length mode flag in variable length mode field 394. The mode length flag of variable length mode field 394 may be set by the programmer of the SIMD architecture or by a stored program in response to detecting the type of input data, or in any other manner. The determination of the state of the length mode flag is made by variable length mode control 400.

Therefore, in addition to the capability of reading variable lengths of data as previously described, statistical decoder 372 is also provided with a fixed length reader 396. Fixed length reader 396 may be a known device for reading predetermined amounts of data which is well understood by those skilled in the art. For example, fixed length reader 396 may be a conventional device adapted for reading eight bits of data at a time from an input data stream. As such, fixed length reader 396 may be a dedicated hardware device or may be a programmed operation of a processor, or a combination of the two.

In accordance with the read mode flag of variable length mode field 394, variable length mode controller 400 applies an enable signal to fixed length reader 396 and variable length reader 398 by way of read mode line 402. The signal on read mode line 402 is effective to enable a selected one of readers 396, 398 to provide data from the input stream to the microcoder reader.

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

It will be understood by those skilled in the art that fixed mode reader 396 of statistical decoder 372 may be instructed to read a single bit, or a number of bits. For example, fixed mode length reader 396 may be instructed to read eight bits as previously described. Alternatively, it will be understood that fixed length reader 396 may be adapted to perform a fixed read of any length other than eight bits or may be provided with a one bit read which may be reexecuted a select number of times.

Thus, statistical decoder 372 may operate in the variable length mode except for selected periods wherein it may be programmed to operate in a fixed length mode by means of variable length mode field 394. In addition to permitting periodic fixed reads while statistical decoder 372 operates as a variable length decoder, it will be understood that variable length mode detector 400 may be used o cause statistical decoder 372 to operate alternately as a variable length decoder and a fixed length decoder. For example, if a first series of images is encoded using variable length codes statistical decoder 372 may be programmed to operate upon the entire first series of images in the variable length mode as previously described. If a second series of images is encoded using a fixed length code, statistical decoder 372 may be put into the fixed length mode and operate upon the entire second series in the fixed length mode. Thus decoder 372 may operate as a dual decoder.

UNITED STATES PATENT AND TRADEMARK OFFICE
CERTIFICATE OF CORRECTION

PATENT NO : 5,452,101
DATED : September 19, 1995
INVENTOR(S) : Michael Keith

Figure 15:
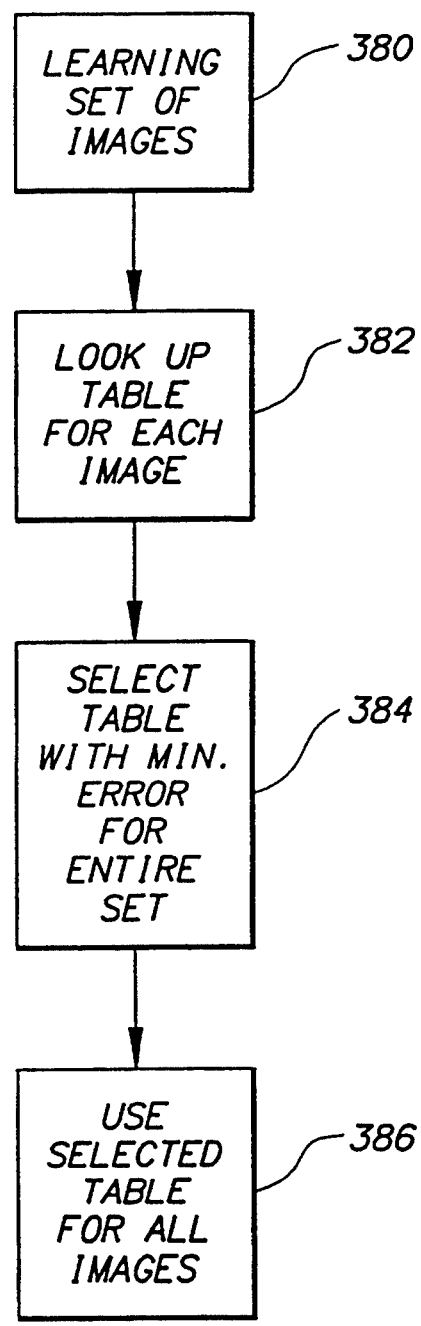
FIG. 15 shows a block diagram representative of a method for determining fixed Huffman tables.

It is certified that error appears in the above-identified patent and that said Letters Patent is hereby corrected as shown below:

Referring now to Fig. 15, there is shown a flow diagram illustrating a method for providing a fixed Huffman table $T_F$ which may be used with the method of the present invention. In this fixed table method a set of statistically-optimized variable-length codes using Huffman encoding are provided. However, a single fixed lookup table $T_F$ is provided for a plurality of images rather than using an individually optimized lookup table for each frame. This single fixed lookup table $T_F$ may be determined by statistical optimization performed upon a set of training images which are typical of the type of images or frames to be encoded.

Huffman table $T_1$ may be used to decode a plurality of differing images which were encoded according to the method set forth in block 380 to block 386 as previously described. Tables of this nature are taught in U.S. patent application Serial Nos. 07/861,227 and 07/901,499, filed on April 1, 1992 and June 19, 1992, respectively, which are incorporated by reference herein.

Thus, the lookup table used to encode a frame is not necessarily optimized for the particular frame being encoded. This may cause some inefficiency in the encoding process. However, this inefficiency is traded off for the greatly simplified processing provided by not determining and transmitting an individual lookup table for each frame.

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

The fixed table obtained in this method may be used for any number of differing frames. It is possible, for example, to determine a fixed table which is optimized for animated images and to use this table for all animated images. It is also possible to determine a fixed table which is optimized for real life images and to use it for all real life images. Additionally, it has been determined that the method of this embodiment provides satisfactory results if a single statistical optimization is performed to provide a single fixed Huffman table for all possible images which may be processed. For example, a training set of images may be selected to include animated images as well as real life images and the single fixed table produced thereby may be used for both types of images.

It will be understood that this system may use any method of statistical optimization which yields a single fixed Huffman table which may be applied to a plurality of differing frames when the plurality of frames is encoded and decoded. One method of statistical optimization involves using the optimized tables determined from a learning set of images as shown in block 380. It is well understood by those skilled in the art how to obtain an individual optimized table for an individual frame of the learning set. In the method of the present invention, this optimization is performed separately on each image of the training set to provide a separate optimized lookup table for each image in the training set. This process provides a set of lookup tables as shown in block 382. Conventional statistical methods may then be used to select that

UNITED STATES PATENT AND TRADEMARK OFFICE
CERTIFICATE OF CORRECTION

PATENT NO : 5,452,101

DATED : September 19, 1995

INVENTOR(S) : Michael Keith

Page 13 of 14

It is certified that error appears in the above-identified patent and that said Letters Patent is hereby corrected as shown below:

lookup table from this set of lookup tables which gives the least overall error when applied to all of the frames in the learning set as shown in block 384.

For example, any of the known methods of determining error may be used to make a separate determination of the error for each table when it is applied to all of the images in the training set. A measure of the total error produced by using a lookup table on all images may then be determined. Finally, the table producing the least overall error when applied to the entire learning set may be selected. The selected table may then be used on all images as the fixed table of the method of the present invention as shown in block 386.

Each encoded image may be provided with an image header containing a flag bit indicating whether the image was encoded using a variable lookup table or a fixed lookup table. As shown in Table I, in the case of variable lookup tables the descriptor indicates how many "x bits" there are in each row of the table. The corresponding format for the number of "x bits" for the eight rows of a fixed table may be: 2, 3, 3, 4, 4, 4, 6, 6.

Thus, it will be understood that tables $T_1$ - $T_8$ of varying sizes which may be stored in memory space 373 of statistical decoded 372 are not limited to the type of table shown in Table 1 or Table 2. The method of the present invention, wherein a larger number of tables having

UNITED STATES PATENT AND TRADEMARK OFFICE
CERTIFICATE OF CORRECTION

PATENT NO : 5,452,101
DATED : September 19, 1995
INVENTOR(S) : Michael Keith

It is certified that error appears in the above-identified patent and that said Letters Patent is hereby corrected as shown below:

decreased precision are provided within memory space 373, may be performed upon any type of decoder tables in addition to the types show in of Tables 1, 2. The tables may be fixed, variable, or any type of decoder table known to those skilled in the art. Furthermore, it will be understood that any method of indexing and using the decoder tables stored according to the method of the present invention may be performed on tables\ $T_1$-$T_8$ or the other tables within the anticipated scope.

Signed and Sealed this

Twenty-third Day of January, 2001

Attest:

Attesting Officer

Q. TODD DICKINSON

Commissioner of Patents and Trademarks

(12) EX PARTE REEXAMINATION CERTIFICATE (5030th)
United States Patent
Keith

(10) Number: US 5,452,101 C1
(45) Certificate Issued: Nov. 30, 2004

(54) APPARATUS AND METHOD FOR DECODING FIXED AND VARIABLE LENGTH ENCODED DATA

(75) Inventor: Michael Keith, Holland, PA (US)

(73) Assignee: Intel Corporation, Santa Clara, CA (US)

Reexamination Request:
No. 90/006,496, Dec. 27, 2002

Reexamination Certificate for:
Patent No.: 5,452,101
Issued: Sep. 19, 1995
Appl. No.: 07/989,602
Filed: Dec. 11, 1992

Certificate of Correction issued Aug. 13, 1996.

Certificate of Correction issued Jan. 23, 2001.

Related U.S. Application Data

(63) Continuation-in-part of application No. 07/782,332, filed on Oct. 24, 1991, now Pat. No. 5,361,370.
(51) Int. Cl.[7] .............................. H04N 9/41; G06K 9/46; G06K 9/56
(52) U.S. Cl. ..................... 382/234; 382/245; 382/246
(58) Field of Search .................. 382/234, 233, 382/236, 239–245, 246, 244–232; 711/220, 206; 341/106, 67–81, 50; 375/240–240.02, 240.12, 240.25

(56) References Cited

U.S. PATENT DOCUMENTS 3,717,851 A * 2/1973 Cocke et al. ............... 711/220
5,361,370 A * 11/1994 Sprague et al. ............. 712/22

OTHER PUBLICATIONS

MPEG Press Release, London, Nov. 6, 1992, pp. 1–5.*

Recommendation H.261—Video Codec for Augdivisual Services at px64kbit/s. ITU–T (CCITT), Aug. 1990. Specialist Group on Coding for Visual Telephony.

Information Technology—Coding of moving pictures and associated audio for digital storage media at up to abou 1,5 Mbit/s–. International Standard ISO/EIC 11172–2, Part 2, 1993.

* cited by examiner

*Primary Examiner*—Wenpeng Chen

(57) ABSTRACT

Single-instruction multiple-data is a new class of integrated video signal processors especially suited for real-time processing of two-dimensional images. The single-instruction, multiple-data architecture is adopted to exploit the high degree of parallelism inherent in many video signal processing algorithms. Features have been added to the architecture which support conditional execution and sequencing—an inherent limitation of traditional single-instruction multiple-data machines. A separate transfer engine offloads transaction processing from the execution core, allowing balancing of input/output and compute resources—a critical factor in optimizing performance for video processing. These features, coupled with a scalable architecture allow a united programming model and application driven performance.

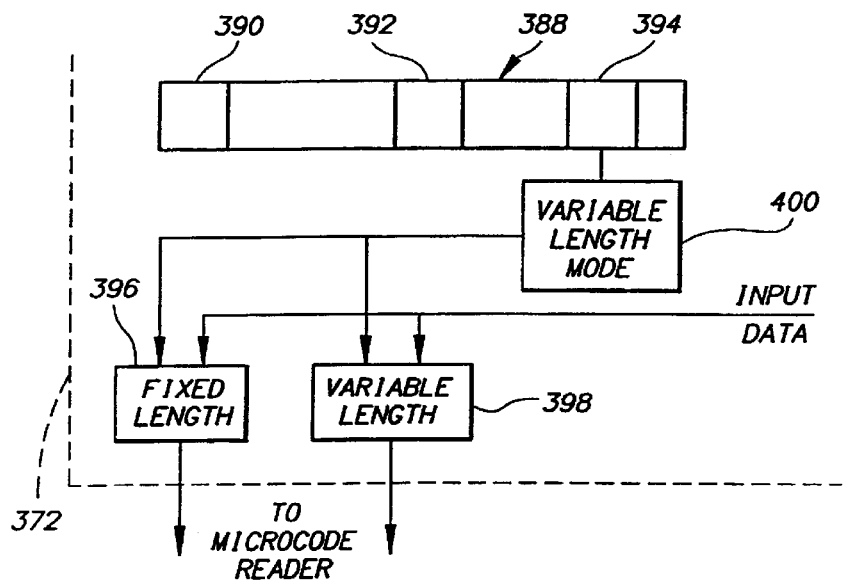

1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 65–81 is confirmed.

Claims 4–7, 16, 19, 28, 31, 37, 39, 43, 45, 49, 50, 53-54, 58-59 and 63–64 are cancelled.

Claims 1, 8, 13, 20, 25, 32, 35-36, 41–42, 47–48, 51–52, 56–57, and 61–62 are determined to be patentable as amended.

Claims 2–3, 9–12, 14–15, 17–18, 21–24, 26–27, 29–30, 33–34, 38, 40, 44, 46, 55 and 60, dependent on an amended claim, are determined to be patentable.

1. A dual data decoder for decoding encoded input data, comprising:
   first and second data reading means for reading variable length encoded data and fixed length encoded data, respectively; [and]
   indicating means for indicating first and second data reading modes corresponding to the first and second data reading means, respectively;
   storage space means for storing decoder tables for decoding the encoded input data, the storage space means having a first configuration for storing a single decoder table of a first size;
   memory control means for reconfiguring the storage space means to provide a second configuration for storing a plurality of decoder tables of a second size; and
   means for decoding the encoded input data selectively (1) in accordance with the single decoder table and (2) in accordance with a selected one of the plurality of decoder tables.

8. [The] *A* dual data decoder [of claim 3, further] *for decoding encoded input data* comprising:
   *first and second data reading means for reading variable length encoded data and fixed length encoded data, respectively;*
   *indicating means for indicating first and second data reading modes corresponding to the first and second data reading means, respectively;*
   *mode determining means coupled to the indicating means for providing a select signal in response to the indicating;*
   *wherein the mode determining means includes means for selecting one of the first and second data reading means in response to the select signal;*
   *means for decoding variable length encoded data and fixed length encoded data;*
   *means for intermittently reading fixed length encoded data while operating in the first data reading mode;*
   *means for alternatively operating in the first and second data reading modes;*
   *storage space means for storing decoder tables for decoding the encoded input data, the storage space means having a first configuration for storing a single decoder table of a first size;*
   *memory control means for reconfiguring the storage space means to provide a second configuration for storing a plurality of decoder tables of a second size; and*
   *means for decoding the encoded input data selectively (1) in accordance with the single decoder table and (2) in accordance with a selected one of the plurality of decoder tables.*

13. A dual data decoder for decoding encoded input data, comprising:
   variable length and fixed length renders for reading variable length encoded data and fixed length encoded data, respectively; [and]
   a memory control register having a variable length mode field for indicating first and second data reading modes corresponding to the variable length and fixed length readers, respectively;
   *a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and*
   *a decoder processor for decoding the encoded input data selectively (1) in accordance with the single decoder table and (2) in accordance with a selected one of the plurality of decoder tables.*

20. [The] *A* dual data decoder [of claim 15, further] *for decoding encoded input data* comprising:
   *variable length and fixed length readers for reading variable length encoded data and fixed length encoded data, respectively;*
   *a memory control register having a variable length mode field for indicating first and second data reading modes corresponding to the variable length and fixed length readers, respectively;*
   *a variable length mode detector coupled to the variable length mode field of the memory control register for providing a select signal in response to the variable length mode field;*
   *wherein the variable length mode detector includes means for selecting one of the variable length and fixed length readers in response to the select signal;*
   *a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size;*
   *a decoder processor for decoding variable length encoded data and fixed length encoded data, and for decoding the encoded input data selectively (1) in accordance with the single decoder table and (2) in accordance with a selected one of the plurality of decoder tables; and*
   *further wherein the dual data decoder is configured for alternatively operating in the first and second data reading modes.*

25. A method for decoding encoded input data, comprising the steps of:

(a) providing the encoded input data, wherein the encoded input data comprises either variable length encoded data or fixed length encoded data;

(b) reading the encoded input data; [and]

(c) indicating first and second data reading modes corresponding to the variable length and fixed length encoded data, respectively;

*(d) storing, using a decoder memory, decoder tables for decoding the encoded input data;*

*(e) configuring selectively the decoder memory for storing (1) a storing decoder table of a first size, or (2) a plurality of decoder tables of a second size; and*

*(f) decoding the encoded input data selectively (1) in accordance with the single decoder table and (2) in accordance with a selected one of the plurality of decoder tables.*

32. [The] *A* method [of claim 27, further] *for decoding encoded input data* comprising the steps of:

providing the encoded input data, wherein the encoded input data comprises either variable length encoded data or fixed length encoded data;

reading the encoded input data;

indicating first and second data reading modes corresponding to the variable length and fixed length encoded data, respectively;

providing a select signal in response to the indicated first or second data reading mode;

reading the encoded input data in either the first or second data reading mode in response to the select signal;

storing, using a decoder memory, decoder tables for decoding the encoded input data;

configuring selectively the decoder memory for storing (1) a single decoder table of a first size, or (2) a plurality of decoder tables of a second size;

decoding, using a processor, the encoded input data selectively (1) in accordance with the single decoder table and (2) in accordance with a selected one of the plurality of decoder tables; and alternatively operating in the first and second data reading modes.

35. A dual data decoder for decoding encoded input data, comprising:

(a) first and second data reading means for reading variable length encoded data and fixed length encoded data, respectively; [and]

(b) means for intermittently reading fixed length encoded data while operating in a first data reading mode, the first data reading mode corresponding to the first data reading means;

*(c) storage space means for storing decoder tables for decoding the encoded input data, the storage space means having a first configuration for storing a single decoder table of a first size;*

*(d) memory control means for reconfiguring the storage space means to provide a second configuration for storing a plurality of decoder tables of a second size; and*

*(e) means for decoding the encoded input data selectively (1) in accordance with the single decoder table and (2) in accordance with a selected one of the plurality of decoder tables.*

36. The dual data decoder of claim 35, further comprising:

([c] *f*) indicating means for indicating the first data reading mode and for indicating a second data reading mode, the second data reading mode corresponding to the second data reading means; and ([d] *g*) mode determining means coupled to the indicating means for providing a select signal in response to the indicating, wherein the mode determining means includes means for selecting one of the first and second data reading means in response to the select signal.

41. A dual data decoder for decoding encoded input data, comprising:

(a) a variable length reader for reading variable length encoded data; [and]

(b) fixed length reader for reading fixed length encoded data, wherein the dual data decoder is configured for intermittently reading fixed length encoded data while operating in a first data reading mode, the first data reading mode corresponding to the variable length reader;

*(c) a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and*

*(d) a decoder processor for decoding the encoded input data selectively (1) in accordance with the single decoder table and (2) in accordance with a selected one of the plurality of decoder tables.*

42. The dual data decoder of claim 41, further comprising:

([c] *e*) a memory control register having a variable length mode field for indicating the first data reading mode and for indicating a second data reading mode, the second data reading mode corresponding to the fixed length reader; and ([d] *f*) a variable length mode detector coupled to the variable length mode field of the memory control register for providing a select signal in response to the variable length mode field, wherein the variable length mode detector includes means for selecting one of the variable length and fixed length readers in response to the select signal.

47. A method for decoding encoded input data, comprising the steps of:

(a) providing the encoded input data, wherein the encoded input data comprises either variable length encoded data or fixed length encoded data; [and]

(b) intermittently reading fixed length encoded data while operating in a first data reading mode corresponding to the variable length encoded data;

*(c) storing, using a decoder memory, decoder tables for decoding the encoded input data;*

*(d) configuring selectively the decoder memory for storing (1) a single decoder table of a first size, or (2) a plurality of decoder tables of a second size; and*

*(e) decoding the encoded input data selectively (1) in accordance with the single decoder table and (2) in accordance with a selected one of the plurality of decoder tables.*

48. The method of claim 47, further comprising the steps of:

([c] *f*) indicating a variable or fixed status corresponding to the variable length and fixed length encoded data, respectively; and ([d]*g*) providing a select signal in response to the indicated variable or fixed status, wherein step (b) comprises the step of intermittently reading fixed length encoded data in response to the select signal while operating in a first data reading mode.

51. A dual data decoder for decoding encoded input data, comprising:
   (a) first and second data reading means for reading variable length encoded data and fixed length encoded data, respectively; [and]
   (b) means for alternatively operating in first and second data reading modes corresponding to the first and second data reading means, respectively;
   *(c) storage space means for storing decoder tables for decoding the encoded input data, the storage space means having a first configuration for storing a single decoder table of a first size;*
   *(d) memory control means for reconfiguring the storage space means to provide a second configuration for storing a plurality of decoder tables of a second size; and*
   *(e) means for decoding the encoded input data selectively (1) in accordance with the single decoder table and (2) in accordance with a selected one of the plurality of decoder tables.*

52. The dual data decoder of claim 51, further comprising:
   ([c] *f*) indicating means for indicating the first and second data reading modes;
   ([d] *g*) mode determining means coupled to the indicating means for providing a select signal in response to the indicating, wherein the mode determining means includes means for selecting one of the first and second data reading means in response to the select signal.

56. A dual data decoder for decoding encoded input data, comprising:
   (a) a variable length reader for reading variable length encoded data; [and]
   (b) a fixed length reader for reading fixed length encoded data, wherein the dual data decoder is configured for alternatively operating in first and second data reading modes, the first and second data reading modes corresponding to the variable length and fixed length readers, respectively;
   *(c) a decoder memory for storing decoder tables for decoding the encoded input data, the decoder memory having a first configuration for storing a single decoder table of a first size, wherein the memory control register is for reconfiguring the decoder memory to provide a second configuration for storing a plurality of decoder tables of a second size; and*
   *(d) a decoder processor for decoding the encoded input data selectively (1) in accordance with the single decoder table and (2) in accordance with a selected one of the plurality of decoder tables.*

57. The dual data decoder of claim 56, further comprising:
   ([c] *e*) a memory control register having a variable length mode field for indicating the first and second data reading modes; and
   ([d] *f*) a variable length mode detector coupled to the variable length mode field of the memory control register for providing a select signal in response to the variable length mode field, wherein the variable length mode detector includes means for selecting one of the variable length and fixed length readers in response to the select signal.

61. A method for decoding encoded input data, comprising the steps of:
   (a) providing the encoded input data, wherein the encoded input data comprises either variable length encoded data or fixed length encoded data;
   (b) reading the encoded input data;
   (c) alternatively operating in first and second data reading modes corresponding to the variable length and fixed length encoded data, respectively;
   *(d) storing, using a decoder memory, decoder tables for decoding the encoded input data;*
   *(e) configuring selectively the decoder memory for storing (1) a single decoder table of a first size, or (2) a plurality of decoder tables of a second size; and*
   *(f) decoding the encoded input data selectively (1) in accordance with the single decoder table and (2) in accordance with a selected one of the plurality of decoder tables.*

62. The method of claim 61, further comprising the steps of:
   ([d] *g*) indicating the first and second data reading modes;
   ([e] *h*) providing a select signal in response to the indicated first or second data reading mode; and
   ([f] *i*) reading the encoded input data in either the first or second data reading mode in response to the select signal.

* * * * *